US011339457B2

(12) United States Patent
Snydacker

(10) Patent No.: US 11,339,457 B2
(45) Date of Patent: May 24, 2022

(54) PROCESS FOR SEPARATING UNDESIRABLE METALS

(71) Applicant: Lilac Solutions, Inc., Oakland, CA (US)

(72) Inventor: David Henry Snydacker, Oakland, CA (US)

(73) Assignee: LILAC SOLUTIONS, INC., Oakland, CA (US)

( * ) Notice: Subject to any disclaimer, the term of this patent is extended or adjusted under 35 U.S.C. 154(b) by 0 days.

(21) Appl. No.: 17/169,251

(22) Filed: Feb. 5, 2021

(65) Prior Publication Data

US 2021/0214820 A1 Jul. 15, 2021

Related U.S. Application Data

(63) Continuation of application No. PCT/US2021/012534, filed on Jan. 7, 2021.

(60) Provisional application No. 62/959,078, filed on Jan. 9, 2020.

(51) Int. Cl.
| | | |
|---|---|---|
| *C22B 26/00* | (2006.01) | |
| *C22B 26/12* | (2006.01) | |
| *C22B 3/42* | (2006.01) | |
| *C22B 7/00* | (2006.01) | |

(52) U.S. Cl.
CPC ............. *C22B 26/12* (2013.01); *C22B 3/42* (2013.01); *C22B 7/007* (2013.01); *C22B 7/008* (2013.01)

(58) Field of Classification Search
CPC ........... C22B 26/12; C22B 3/42; C22B 7/007; C22B 7/008
See application file for complete search history.

(56) References Cited

U.S. PATENT DOCUMENTS

| | | |
|---|---|---|
| 3,793,433 A | 2/1974 | Seeley et al. |
| 4,116,858 A | 9/1978 | Lee et al. |
| 4,159,311 A | 6/1979 | Bauman et al. |
| 4,382,124 A | 5/1983 | Meitzner et al. |
| 4,747,949 A | 5/1988 | Barkey |
| 5,039,382 A | 8/1991 | Suzuki et al. |
| 5,639,861 A | 6/1997 | Steffier |
| 6,171,489 B1 | 1/2001 | Ballard et al. |
| 7,435,477 B2 | 10/2008 | Adachi et al. |
| 7,541,016 B2 | 6/2009 | Gorshkov et al. |
| 7,820,327 B2 | 10/2010 | Yumoto et al. |
| 8,454,816 B1 * | 6/2013 | Harrison ................. C22B 47/00 205/540 |
| 8,506,851 B2 | 8/2013 | Ravet et al. |
| 8,679,224 B2 | 3/2014 | Brown et al. |
| 8,741,150 B2 | 6/2014 | Chung et al. |
| 8,778,289 B2 | 7/2014 | Chon et al. |
| 9,034,294 B1 | 5/2015 | Harrison |
| 9,677,181 B2 | 6/2017 | Bourassa et al. |
| 10,150,056 B2 | 12/2018 | Snydacker |
| 10,439,200 B2 | 10/2019 | Snydacker et al. |
| 10,505,178 B2 | 12/2019 | Snydacker et al. |
| 10,648,090 B2 | 5/2020 | Snydacker et al. |
| 10,695,694 B2 | 6/2020 | Snydacker |
| 2004/0005267 A1 | 1/2004 | Boryta et al. |
| 2007/0138020 A1 | 6/2007 | Balagopal et al. |
| 2010/0116748 A1 | 5/2010 | Rasmussen et al. |
| 2011/0044882 A1 | 2/2011 | Buckley et al. |
| 2011/0067230 A1 | 3/2011 | Tan et al. |
| 2011/0174739 A1 | 7/2011 | Chung et al. |
| 2013/0001168 A1 | 1/2013 | Kim et al. |
| 2013/0306565 A1 | 11/2013 | Davis |
| 2014/0113197 A1 | 4/2014 | Xiao et al. |
| 2014/0239221 A1 | 8/2014 | Harrison et al. |
| 2015/0013499 A1 | 1/2015 | Asano et al. |
| 2015/0083667 A1 | 3/2015 | Stouffer |
| 2015/0152523 A1 | 6/2015 | Sharma |
| 2015/0197830 A1 | 7/2015 | Chon et al. |
| 2015/0203542 A1 | 7/2015 | Bagnoli et al. |
| 2016/0115040 A1 | 4/2016 | Yi et al. |
| 2016/0230250 A1 | 8/2016 | Chung et al. |
| 2017/0022617 A1 | 1/2017 | Magnan et al. |
| 2017/0028395 A1 | 2/2017 | Bewsey |
| 2017/0175228 A1 | 6/2017 | Hunwick |
| 2017/0189855 A1 | 7/2017 | Xiang et al. |
| 2017/0217796 A1 | 8/2017 | Snydacker et al. |
| 2018/0016153 A1 | 1/2018 | Sharma |
| 2018/0080133 A1 | 3/2018 | Smith et al. |
| 2018/0133619 A1 | 5/2018 | Snydacker |
| 2018/0245180 A1 | 8/2018 | Cheng et al. |
| 2019/0256987 A1 | 8/2019 | Snydacker et al. |
| 2019/0276327 A1 | 9/2019 | Brown |
| 2020/0165699 A1 | 5/2020 | Snydacker et al. |
| 2020/0230591 A1 | 7/2020 | Snydacker |
| 2020/0232105 A1 | 7/2020 | Snydacker et al. |
| 2020/0289958 A1 | 9/2020 | Snydacker |
| 2021/0077990 A1 | 3/2021 | Snydacker et al. |
| 2021/0380429 A1 | 12/2021 | Snydacker |

FOREIGN PATENT DOCUMENTS

| | | |
|---|---|---|
| CN | 101961634 A | 2/2011 |
| CN | 102872792 A | 1/2013 |
| CN | 103794779 A | 5/2014 |
| CN | 105238927 A | 1/2016 |
| CN | 105251436 A | 1/2016 |

(Continued)

OTHER PUBLICATIONS

Chitrakar et al. Lithium recovery from salt lake brine by H2TiO3. Dalton Trans 43:8933-8939 (2014).

(Continued)

*Primary Examiner* — Steven J Bos
(74) *Attorney, Agent, or Firm* — Wilson Sonsini Goodrich & Rosati

(57) ABSTRACT

Disclosed herein are processes and systems relating to separation, handling, and disposal of undesirable metals to facilitate recovery of desirable metals, including lithium. Undesirable metals may be precipitated at high pH and separated from a liquid resource to facilitate recovery of the desirable metals. The precipitated undesirable metals may then be redissolved and recombined with the liquid resource for disposal.

27 Claims, 3 Drawing Sheets

(56) References Cited

FOREIGN PATENT DOCUMENTS

| | | | |
|---|---|---|---|
| CN | 105289455 A | 2/2016 | |
| CN | 205151853 U | 4/2016 | |
| CN | 106311190 A | 1/2017 | |
| CN | 106673023 A | 5/2017 | |
| CN | 107043116 A | 8/2017 | |
| EP | 2945211 B1 | 11/2018 | |
| FR | 3034781 A1 | 10/2016 | |
| JP | H08236114 A | 9/1996 | |
| JP | 2003500318 A | 1/2003 | |
| JP | 2005296811 A | 10/2005 | |
| JP | 2009507839 A | 2/2009 | |
| JP | 2010042395 A | 2/2010 | |
| JP | 2014055312 A | 3/2014 | |
| JP | 2015020090 A | 2/2015 | |
| JP | 5898021 B2 | 4/2016 | |
| JP | 2017131863 A | 8/2017 | |
| JP | 2019099874 A | 6/2019 | |
| KR | 20120063424 A | 6/2012 | |
| KR | 20140082065 A | 7/2014 | |
| KR | 20160126314 A | 11/2016 | |
| WO | WO-2010056322 A1 | 5/2010 | |
| WO | WO-2010103173 A1 | 9/2010 | |
| WO | 2012-005545 | * | 1/2012 |
| WO | WO-2015171109 A1 | 11/2015 | |
| WO | WO-2016064689 A2 | 4/2016 | |
| WO | WO-2016172017 A1 | 10/2016 | |
| WO | WO-2017005113 A1 | 1/2017 | |
| WO | WO-2017020090 A1 | 2/2017 | |
| WO | WO-2017136328 A1 | 8/2017 | |
| WO | WO-2017137885 A1 | 8/2017 | |
| WO | WO-2018089932 A1 | 5/2018 | |
| WO | WO-2019000095 A1 | 1/2019 | |
| WO | WO-2019028148 A1 | 2/2019 | |
| WO | WO-2019028174 A2 | 2/2019 | |
| WO | WO-2019126862 A1 | 7/2019 | |
| WO | WO-2019168941 A1 | 9/2019 | |
| WO | WO-2021142147 A1 | 7/2021 | |
| WO | WO-2021252381 A1 | 12/2021 | |

OTHER PUBLICATIONS

Chitrakar et al. Selective Uptake of Lithium Ion from Brine by H1.33Mn1.67O4 and H1.6Mn1.6O4. Chem Lett 41:1647-1649 (2012).

Cho et al. High-Performance ZrO2-Coated LiNiO2 Cathode Material. Electrochem Solid-State Lett 4(10):A159-A161 (2001).

Department of Energy. Ion Exchange Materials for Lithium Extraction (Topic: 15, Subtopic:e)—Abstract. Available at https://www.sbir.gov/sbirsearch/detail/1307793 (3 pgs.) (2017).

Larumbe et al. Effect of a SiO2 coating on the magnetic properties of Fe3O4 nanoparticles. JPhys: Condens Matter 24(26):266007 (2012).

Nishihama et al. Selective recovery process of lithium from seawater using integrated ion exchange methods. Solvent Extraction and Ion Exchange 29:421-431 (2011).

Oh et al. Double Carbon Coating of LiFePO4 as High Rate Electrode for Rechargeable Lithium Batteries. Adv. Mater. 22:4842-4845 (2010).

Pareja et al. Corrosion behaviour of zirconia barrier coatings on galvanized steel. Surface and Coatings Technology 200(22-23):6606-6610 (2006).

Patel et al. Ionic and electronic conductivities of atomic layer deposition thin film coated lithium ion battery cathode particles. RSC Advances 6:98768-98776 (2016).

PCT/US2017/061384 International Search Report and Written Opinion dated Feb. 14, 2018.

PCT/US2018/044821 International Search Report and Written Opinion dated Oct. 12, 2018.

PCT/US2018/044868 International Search Report and Written Opinion dated Mar. 6, 2019.

PCT/US2019/017885 International Search Report and Written Opinion dated Jun. 14, 2019.

PCT/US2019/019780 International Search Report and Written Opinion dated Jun. 14, 2019.

Tarakina et al. Defect crystal structure of new TiO(OH)2 hydroxide and related lithium salt Li2TiO3. Dalton Trans 39:8168-8176 (2010).

Umeno et al. Preparation and Adsorptive Properties of Membrane-Type Adsorbents for Lithium Recovery from Seawater. Ind Eng Chem Res 41(17):4281-4287 (2002).

PCT/US2021/012534 International Search Report and Written Opinion dated Apr. 27, 2021.

Xiao et al. Lithium ion recovery from brine using granulated polyacrylamide-MnO 2 ion-sieve. Chemical Engineering Journal 279:659-666 (2015).

Zandvakili et al. Preparation and characterisation of lithium ion exchange composite for the recovery of lithium from brine. Mineral Processing and Extractive Metallurgy 127(3):176-181 (2017).

Miyai et al. Bench scale studies on lithium recovery from sea water. Nippon Kaisui Gakkai-Shi—Bulletin Of The Society Of Sea Waterscience, Japan 49(4):226-230 (1995) (English Abstract).

Xiao et al. Adsorption and desorption behavior of lithium ion in spherical PVC—MnO2 ion sieve. Industrial & engineering chemistry research, 51(33):10921-10929 (2012).

PCT/US2021/036227 International Search Report and Written Opinion dated Nov. 2, 2021.

Co-pending U.S. Appl. No. 17/590,223, inventors Snydacker; David Henry et al., filed Feb. 1, 2022.

PCT/US2021/059921 International Search Report and Written Opinion dated Mar. 14, 2022.

Reichel et al. Lithium recovery from lithium-containing micas using sulfur oxidizing microorganisms. Minerals Engineering 106:18-21 (2017).

Rioyo et al. Lithium Extraction from Spodumene by the Traditional Sulfuric Acid Process: A Review. Mineral Processing and Extractive Metallurgy Review 43(1):97-106 (2020).

* cited by examiner

PROCESS FOR SEPARATING UNDESIRABLE METALS

CROSS-REFERENCE

This application is a continuation of International Application No. PCT/US2021/12534, filed Jan. 7, 2021, which claims the benefit of U.S. Provisional Application No. 62/959,078, filed Jan. 9, 2020, which is incorporated by reference herein in its entirety.

BACKGROUND OF THE INVENTION

Liquid resources such as geothermal brines contain a combination of desirable and undesirable metals, and recovery of the desirable metals can be facilitated by separation and handling of the undesirable metals.

SUMMARY OF THE INVENTION

Desirable metals can be recovered from liquid resources using direct extraction technologies. This recovery of desirable metals can be facilitated by separating undesirable metals from the liquid resource. Handling of the separated undesirable metals can present a major challenge. This invention relates to separation, handling, and disposal of undesirable metals to facilitate recovery of desirable metals including lithium. Undesirable metals may be precipitated at high pH and separated from the liquid resource to facilitate recovery of the desirable metals, and then the precipitated undesirable metals may be redissolved and recombined with the liquid resource for disposal.

In one aspect, disclosed herein is a process for recovering a desirable metal from a liquid resource, the process comprising: a) precipitating an undesirable metal from the liquid resource to form an undesirable metal precipitate; b) separating said undesirable metal precipitate from the liquid resource to form a feed liquid; c) recovering said desirable metal from the feed liquid to form a raffinate; and d) redissolving said undesirable metal precipitate into said raffinate to form a raffinate mixture. In some embodiments, said recovering comprises contacting said feed liquid with ion exchange particles that absorb said desirable metals while releasing protons. In some embodiments, said desirable metal comprises lithium. In some embodiments, said undesirable metal comprises a transition metal. In some embodiments, said precipitating comprises adding a base to the liquid resource. In some embodiments, said precipitating comprises adding a base and/or an oxidant to the liquid resource. In some embodiments, said precipitating comprises adding NaOH and/or Ca(OH)2 to the liquid resource. In some embodiments, said precipitating comprises adding air and/or hydrogen peroxide to the liquid resource. In some embodiments, said redissolving comprises combining an acid with said undesirable metal precipitate. In some embodiments, said combining an acid with said undesirable metal precipitate occurs 1) prior to combining said undesirable metal precipitate with said raffinate, or 2) after combining said undesirable metal precipitate with said raffinate. In some embodiments, the acid comprises hydrochloric acid and/or sulfuric acid. In some embodiments, said acid and/or said base are produced with an electrochemical cell. In some embodiments, the electrochemical cell comprises electrodes and membranes. In some embodiments, said acid and/or said base are produced from a salt solution. In some embodiments, said acid and/or said base are produced by splitting said salt solution. In some embodiments, said salt solution comprises a sodium chloride solution. In some embodiments, said acid and/or said base are produced by processing said sodium chloride solution into a hydrochloric acid solution and/or a sodium hydroxide solution, wherein the hydrochloric acid solution comprises said acid and the sodium hydroxide solution comprises said base. In some embodiments, the process further comprises extracting sodium chloride from the liquid resource to form the sodium chloride solution. In some embodiments, said precipitating comprises adding chemicals to the liquid resource. In some embodiments, said separating of the undesirable metal precipitate comprises filtration, gravity sedimentation, centrifugal sedimentation, magnetic fields, other methods of solid-liquid separation, or any combination thereof. In some embodiments, said separating of the undesirable metal precipitate comprises using a filter, a settling tank, a clarifier, a hydrocyclone, a centrifuge, or combinations thereof. In some embodiments, said separating of the undesirable metal precipitate comprises using a centrifuge. In some embodiments, the process further comprises injecting the raffinate mixture underground. In some embodiments, the liquid resource is obtained from a reservoir. In some embodiments, the liquid resource is pumped out of the reservoir. In some embodiments, the process further comprises injecting the raffinate mixture into said reservoir. In some embodiments, the reservoir is located underground.

In another aspect, disclosed herein is a process for separating an undesirable metal from a liquid resource, the process comprising: a) adding a base to said liquid resource to precipitate said undesirable metal thereby forming an undesirable metal precipitate; b) separating said undesirable metal precipitate from the liquid resource to form a feed liquid; c) recovering a desirable metal from the feed liquid; and d) combining an acid to said undesirable metal precipitate to form a solution of redissolved undesirable metals for disposal. In some embodiments, said recovering comprises contacting said feed liquid with ion exchange particles that absorbs said desirable metal while releasing protons. In some embodiments, said desirable metal comprises lithium. In some embodiments, said undesirable metal comprises a transition metal. In some embodiments, the process further comprises adding an oxidant with said base to said liquid resource. In some embodiments, said base comprises NaOH and/or Ca(OH)$_2$ to the liquid resource. In some embodiments, said oxidant comprises air and/or hydrogen peroxide to the liquid resource. In some embodiments, the acid comprises hydrochloric acid and/or sulfuric acid. In some embodiments, said acid and/or said base are produced with an electrochemical cell. In some embodiments, the electrochemical cell comprises electrodes and membranes. In some embodiments, said acid and/or said base are produced from a salt solution. In some embodiments, said acid and/or said base are produced by splitting said salt solution. In some embodiments, the salt solution comprises a sodium chloride solution. In some embodiments, said acid and/or said base are produced by processing said sodium chloride solution into a hydrochloric acid solution and/or a sodium hydroxide solution, wherein the hydrochloric acid solution comprises said acid and the sodium hydroxide solution comprises said base. In some embodiments, the process further comprises extracting sodium chloride from the liquid resource to form the sodium chloride solution. In some embodiments, said separating of the undesirable metal precipitate comprises filtration, gravity sedimentation, centrifugal sedimentation, magnetic fields, other methods of solid-liquid separation, or any combination thereof. In some embodiments, said separating of the undesirable metal precipitate comprises using a filter, a settling tank, a clarifier, a hydrocyclone, a centrifuge, or combinations thereof. In some embodiments, said separating of the undesirable metal precipitate comprises using a centrifuge. In some embodiments, said disposal comprises injecting the solution of redissolved undesirable metals underground. In some embodiments, the liquid resource is obtained from a reservoir. In some embodiments, the liquid resource is pumped out of the reservoir. In some embodiments, said disposal comprises injecting the solution of redissolved undesirable metals into said reservoir. In some embodiments, the reservoir is located underground.

In another aspect, disclosed herein is a process for recovering lithium from a liquid resource, said process comprising: a) precipitating a transition metal from said liquid resource to form a transition metal precipitate; b) separating said transition metal precipitate from the liquid resource to form a feed liquid; c) recovering said lithium from said feed liquid to form a raffinate, wherein said recovering of lithium comprises contacting said feed liquid with ion exchange particles that absorb said lithium while releasing protons; and d) redissolving said transition metal precipitate into said raffinate to form a raffinate mixture. In some embodiments, said precipitating comprises adding a base to the liquid resource. In some embodiments, said precipitating comprises adding a base and an oxidant to the liquid resource. In some embodiments, said precipitating comprises adding NaOH and/or $Ca(OH)_2$ to the liquid resource. In some embodiments, said precipitating comprises adding air or hydrogen peroxide to the liquid resource. In some embodiments, said redissolving comprises combining an acid with the transition metal precipitate. In some embodiments, said combining an acid with said transition metal precipitate occurs 1) prior to combining said transition metal precipitate with said raffinate, or 2) after combining said transition metal precipitate with said raffinate. In some embodiments, the acid comprises hydrochloric acid and/or sulfuric acid. In some embodiments, said acid and/or said base are produced with an electrochemical cell. In some embodiments, the electrochemical cell comprises electrodes and membranes. In some embodiments, said acid and/or said base are produced from a salt solution. In some embodiments, said acid and/or said base are produced by splitting said salt solution. In some embodiments, said salt solution comprises a sodium chloride solution. In some embodiments, said acid and/or said base are produced by processing said sodium chloride solution into a hydrochloric acid solution and/or a sodium hydroxide solution, wherein the hydrochloric acid solution comprises said acid and the sodium hydroxide solution comprises said base. In some embodiments, the process further comprises extracting sodium chloride from the liquid resource to form the sodium chloride solution. In some embodiments, said precipitating comprises adding chemicals to the liquid resource. In some embodiments, said separating of said transitional metal precipitate comprises filtration, gravity sedimentation, centrifugal sedimentation, magnetic fields, other methods of solid-liquid separation, or combinations thereof. In some embodiments, said separating of said transitional metal comprises using a filter, a settling tank, a clarifier, a hydrocyclone, a centrifuge, or combinations thereof. In some embodiments, said separating of said transitional metal comprises using a centrifuge. In some embodiments, the process further comprising injecting the raffinate mixture underground. In some embodiments, the liquid resource is obtained from a reservoir. In some embodiments, the liquid resource is pumped out of the reservoir. In some embodiments, the process further comprises injecting the raffinate mixture into said reservoir. In some embodiments, the reservoir is located underground.

For any process disclosed herein, said desirable metal comprises lithium. For any process disclosed herein, said undesirable metals comprise iron and/or manganese. For any process disclosed herein, the desirable metal comprises Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, or any combination thereof. For any process disclosed herein, the undesirable metal comprises Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, or any combination thereof. For any process disclosed herein, the desirable metal is different from the undesirable metal.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
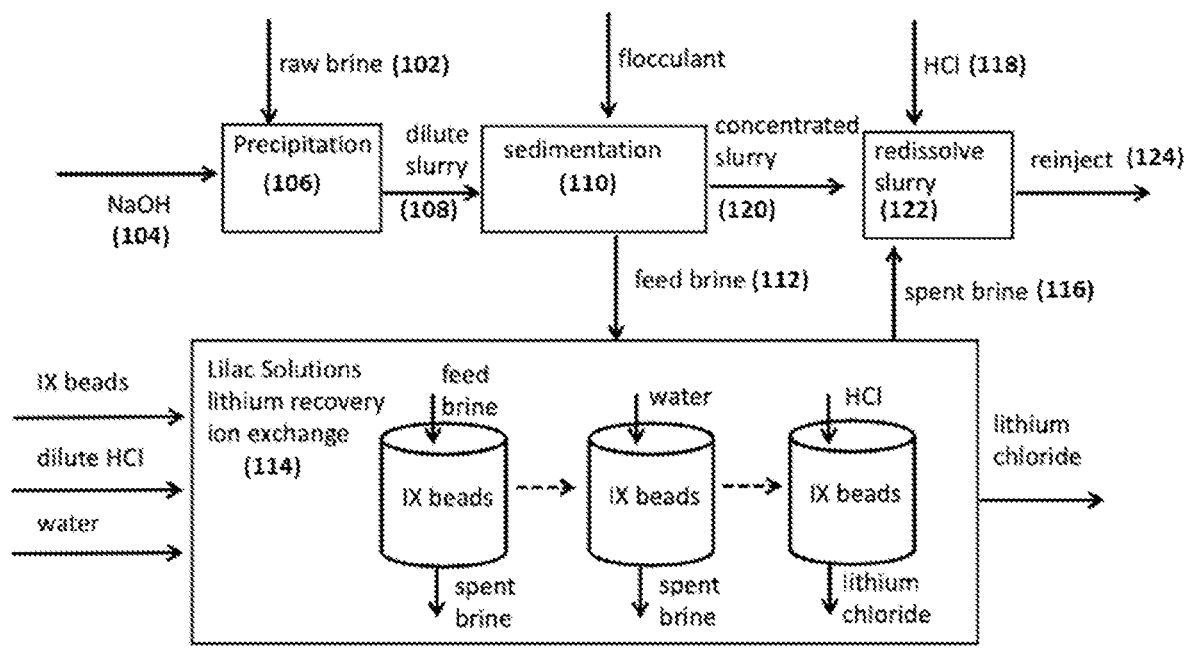
FIG. 1 illustrates a system for precipitating undesirable metals from a liquid resource, separating precipitated undesirable metals from the liquid resource using sedimentation, recovering desirable metals from the liquid resource, and redissolving the undesirable metals in the liquid resource.

The terms "lithium", "lithium ion", and "$Li^+$" are used interchangeably in the present specification and these terms are synonymous unless specifically noted to the contrary. The terms "hydrogen", "hydrogen ion", "proton", and "$H^+$" are used interchangeably in the present specification and these terms are synonymous unless specifically noted to the contrary. The terms "liquid resource" and "brine" are used interchangeably in the present specification and these terms are synonymous unless specifically noted to the contrary.

As used herein, the term "about" refers to an amount that is near the stated amount by 10%, 5%, or 1%, including increments therein.

Desirable metals can be recovered from liquid resources using direct extraction technologies. This recovery of desirable metals can be facilitated by separating undesirable metals from the liquid resource. Handling of the separated undesirable metals can present a major challenge. This invention relates to separation, handling, and disposal of undesirable metals to facilitate recovery of desirable metals including lithium. Undesirable metals may be precipitated at high pH and separated from the liquid resource to facilitate recovery of the desirable metals, and then the precipitated undesirable metals may be redissolved and recombined with the liquid resource for disposal.

The Liquid Resource

The liquid resource, as disclosed herein, refers to a natural brine, a dissolved salt flat, seawater, concentrated seawater, a geothermal brine, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In one embodiment, the liquid resource is at a temperature of −10 to 400° C. In one embodiment, the liquid resource is at a temperature of −10 to 20° C., 20 to 50° C., 50 to 100° C., 100 to 200° C., or 200 to 400° C. In one embodiment, the liquid resource is heated or cooled to precipitate or dissolve species in the liquid resource, or to facilitate removal of metals from the liquid resource.

In one embodiment, the liquid resource contains lithium at a concentration between 0 to 2000 mg/L. In one embodiment, the liquid resource contains lithium at a concentration of less than 1 mg/L, 1 to 50 mg/L, 50 to 200 mg/L, 200 to 500 mg/L, 500 to 2,000 mg/L, or greater than 2,000 mg/L. In one embodiment, the liquid resource contains calcium at a concentration between 100 to 150,000 mg/L. In one embodiment, the liquid resource contains calcium at a concentration of 100 to 1,000 mg/L, 1,000 to 10,000 mg/L, 10,000 to 50,000 mg/L, 50,000 to 150,000 mg/L, or greater than 150,000 mg/L. In one embodiment, the liquid resource contains potassium at a concentration between 100 to 150,000 mg/L. In one embodiment, the liquid resource contains potassium at a concentration of 100 to 1,000 mg/L, 1,000 to 10,000 mg/L, 10,000 to 50,000 mg/L, 50,000 to 150,000 mg/L, or greater than 150,000 mg/L.

In one embodiment, the liquid resource contains iron at a concentration between 0 to 50,000 mg/L. In one embodiment, the liquid resource contains iron at a concentration of less than 1 mg/L, 1 to 100 mg/L, 100 to 1,000 mg/L, 1,000 to 10,000 mg/L, 10,000 to 50,000 mg/L, or greater than 50,000 mg/L. In one embodiment, the liquid resource contains manganese at a concentration between 0 to 50,000 mg/L. In one embodiment, the liquid resource contains manganese at a concentration of less than 1 mg/L, 1 to 100 mg/L, 100 to 1,000 mg/L, 1,000 to 10,000 mg/L, 10,000 to 50,000 mg/L, or greater than 50,000 mg/L. In one embodiment, the liquid resource contains lead at a concentration between 0 to 2,000 mg/L. In one embodiment, the liquid resource contains lead at a concentration of less than 1 mg/L, 1 to 50 mg/L, 50 to 200 mg/L, 200 to 500 mg/L, 500 to 2,000 mg/L, or greater than 2,000 mg/L.

In one embodiment, the liquid resource is treated to remove certain metals to produce a feed liquid. In one embodiment, the feed liquid contains iron at a concentration between 0 to 1,000 mg/L. In one embodiment, the feed liquid contains iron at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed liquid contains manganese at a concentration between 0 to 1,000 mg/L. In one embodiment, the feed liquid contains manganese at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed liquid contains lead at a concentration between 0 to 1,000 mg/L. In one embodiment, the feed liquid contains lead at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed liquid contains zinc at a concentration between 0 to 1,000 mg/L. In one embodiment, the feed liquid contains zinc at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed liquid contains lithium at a concentration between 0 to 2,000 mg/L. In one embodiment, the feed liquid contains lithium at a concentration of 1 to 50 mg/L, 50 to 200 mg/L, 200 to 500 mg/L, 500 to 2,000 mg/L, or greater than 2,000 mg/L.

In one embodiment, the feed liquid is processed to recover metals such as lithium and yield a spent brine or raffinate. In one embodiment, the raffinate contains residual quantities of the recovered metals at a concentration between 0 to 1,000 mg/L. In one embodiment, the raffinate contains residual quantities of the recovered metals at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L.

In one embodiment, the pH of the liquid resource, feed liquid, and/or raffinate is corrected to less than 0, 0 to 1, 1 to 2, 2 to 4, 4 to 6, 6 to 8, 4 to 8, 8 to 9, 9 to 10, 9 to 11, or 10 to 12. In one embodiment, the pH of the liquid resource, feed liquid, and/or raffinate is corrected to less than about 4, 4 to 6, 6 to 8, 4 to 8, 8 to 9, 9 to 10, 9 to 11, or 10 to 12. In one embodiment, the pH of the liquid resource, feed liquid, and/or raffinate is corrected to precipitate or dissolve metals.

In one embodiment, at least one metal is precipitated from the liquid resource to form at least one precipitate. In one embodiment, the precipitates include transition metal hydroxides, oxy-hydroxides, sulfide, flocculants, aggregate, agglomerates, or combinations thereof. In one embodiment, the precipitates include Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, other metals, or any combination thereof. In one embodiment, the precipitates are concentrated into a slurry, a filter cake, a wet filter cake, a dry filter cake, a dense slurry, and/or a dilute slurry.

In one embodiment, the precipitates contain iron at a concentration between 0 to 800,000 mg/kg. In one embodiment, the precipitates contain iron at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain manganese at a concentration between 0 to 800,000 mg/kg. In one embodiment, the precipitates contain manganese at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain lead at a concentration between 0 to 800,000 mg/kg. In one embodiment, the precipitates contain lead at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain arsenic at a concentration between 0 to 800,000 mg/kg. In one embodiment, the precipitates contain arsenic at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain magnesium at a concentration between 0 to 800,000 mg/kg. In one embodiment, the precipitates contain magnesium at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals at a concentration between 0 to 800,000 mg/kg. In one embodiment, the precipitates contain Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals at a concentration of less than 0.01 mg/kg, 0.01 to 1 mg/kg, 1 to 100 mg/kg, 100 to 10,000 mg/kg, or 10,000 to 800,000 mg/kg.

In one embodiment, the precipitates are toxic and/or radioactive.

In one embodiment, precipitates are redissolved by combining the precipitates with at least one acid. In one embodiment, precipitates are redissolved by combining the precipitates with at least one acid in a mixing apparatus. In one embodiment, precipitates are redissolved by combining the precipitates with at least one acid using a high-shear mixer.

Lithium is an essential element for batteries and other technologies. Lithium is found in a variety of liquid resources, including natural and synthetic brines and leachate solutions from minerals, clays, and recycled products. Lithium is optionally extracted from such liquid resources using an ion exchange process based on inorganic ion exchange materials. These inorganic ion exchange materials absorb lithium from a liquid resource while releasing hydrogen, and then elute lithium in at least one acid while absorbing hydrogen. This ion exchange process is optionally repeated to extract lithium from a liquid resource and yield a concentrated lithium solution. The concentrated lithium solution is optionally further processed into chemicals for the battery industry or other industries.

Ion exchange materials are optionally formed into beads and the beads are optionally loaded into ion exchange columns, stirred tank reactors, other reactors, or reactor system for lithium extraction. Alternating flows of a liquid resource (e.g., brine), acid, and other solutions are optionally flowed through an ion exchange column, reactors, or reactor system to extract lithium from the liquid resource and produce a lithium concentrate, which is eluted from the column using the acid. As the liquid resource flows through the ion exchange column, reactors, or reactor system, the ion exchange material absorbs lithium while releasing hydrogen, where both the lithium and hydrogen are cations. The release of hydrogen during lithium uptake will acidify the liquid resource and limit lithium uptake unless the pH of the liquid resource is optionally maintained in a suitable range to facilitate thermodynamically favorable lithium uptake and concomitant hydrogen release. In one embodiment, pH of the liquid resource is maintained near a set-point through addition of base to neutralize protons released from the ion exchange material into the liquid resource.

To control the pH of the liquid resource and maintain the pH in a range that is suitable for lithium uptake in an ion exchange column, bases such as NaOH, $Ca(OH)_2$, CaO, KOH, or $NH_3$ are optionally added to the liquid resource as solids, aqueous solutions, or in other forms. For a liquid resource that contain divalent ions such as Mg, Ca, Sr, or Ba, addition of base to the liquid resource can cause precipitation of solids, such as $Mg(OH)_2$ or $Ca(OH)_2$, which can cause problems for the ion exchange reaction. These precipitates cause problems in at least three ways. First, precipitation can remove base from solution, leaving less base available in solution to neutralize protons and maintain pH in a suitable range for lithium uptake in the ion exchange column. Second, precipitates that form due to base addition can clog the ion exchange column, including clogging the surfaces and pores of ion exchange beads and the voids between ion exchange beads. This clogging can prevent lithium from entering the beads and being absorbed by the ion exchange material. The clogging can also cause large pressure heads in the column. Third, precipitates in the column dissolve during acid elution and thereby contaminate the lithium concentrate produced by the ion exchange system. For ion exchange beads to absorb lithium from the liquid resource, an ideal pH range for the liquid resource is optionally 5 to 7, a preferred pH range is optionally 4 to 8, and an acceptable pH range is optionally 1 to 9. In one embodiment, an pH range for the liquid resource is optionally about 1 to about 14, about 2 to about 13, about 3 to about 12, about 4 to about 12, about 4.5 to about 11, about 5 to about 10, about 5 to about 9, about 2 to about 5, about 2 to about 4, about 2 to about 3, about 3 to about 8, about 3 to about 7, about 3 to about 6, about 3 to about 5, about 3 to about 4, about 4 to about 10, about 4 to about 9, about 4 to about 8, about 4 to about 7, about 4 to about 6, about 4 to about 5, about 5 to about 6, about 5 to about 7, about 5 to about 8, about 6 to about 7, about 6 to about 8, or about 7 to about 8.

Process for Handling of Undesirable Metals to Facilitate Recovery of Desirable Metals Direct extraction technologies can be used to recover one or more desirable metals from liquid resources. In one embodiment, direct extraction technologies include ion exchange technologies, absorption technologies, solvent extraction technologies, membrane technologies, direct precipitation technologies, and combinations thereof. In one embodiment, desirable metals include Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals. In one embodiment, liquid resources contain one or more undesirable metals. In one embodiment, undesirable metals include Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals. In one embodiment, one or more metals are undesirable for a certain process but are desirable for a different process.

In one embodiment, ion exchange materials are used to recover lithium from a liquid resource. In one embodiment, metals such as iron, manganese, and/or other metals interfere with the lithium recovery process and are therefore undesirable to have in the liquid resource during lithium recovery. In one embodiment, undesirable metals such as iron and manganese are precipitated from the liquid resource and the resulting precipitates are separated from the liquid resource to create a feed liquid that has a reduced concentration of these undesirable metals, so as to facilitate recovery of lithium and/or other desirable metals from the feed liquid. In one embodiment, the precipitated iron, manganese, and/or other undesirable metals present a challenge related to low value and high disposal cost. In one embodiment, the precipitated iron, manganese, and/or other undesirable metals may be redissolved for disposal. In one embodiment, the precipitated iron, manganese, and/or other undesirable metals may be precipitated from the liquid resource by the addition of at least one base, such as $Ca(OH)_2$ and/or NaOH. In one embodiment, the precipitated iron, manganese, and/or other undesirable metals may be redissolved for disposal using at least one acid, such as HCl and/or $H_2SO_4$.

In one embodiment, metals are recovered from a liquid resource using multiple precipitation steps to remove desirable and/or undesirable metals from the liquid resource, and said undesirable and/or desirable metals may be removed and recombined with the resulting processed liquid resource (e.g., feed liquid or raffinate as described herein). In one embodiment, metals are recovered from a liquid resource using multiple precipitation steps to remove desirable and undesirable metals from the liquid resource, and said undesirable metals may be removed and recombined with the resulting processed liquid resource (e.g., liquid resource depleted of desirable metals, or feed liquid, or raffinate as described herein). In one embodiment, desirable metals are precipitated from a liquid resource while undesirable metals remain in the liquid resource. In one embodiment, desirable metals are co-precipitated from a liquid resource with undesirable metals to form a raffinate, and then the desirable and/or undesirable metals may be redissolved in said raffinate. In one embodiment, multiple undesirable metals are precipitated from a liquid resource in subsequent steps using a combination of at least one base, at least one oxidant, a specified temperature, chemicals, membranes, and/or solid-liquid separation devices.

In one embodiment, undesirable metals are 1) precipitated from a liquid resource, 2) removed from the liquid resource, 3) re-dissolved (e.g., in a solution), and 4) mixed with another liquid for disposal. In one embodiment, undesirable metals are removed from a liquid resource through precipitation by addition of base, oxidant, or combinations thereof, followed by removal of the resulting solids (via said precipitation of the undesirable metals) from the liquid resource, followed by redissolution of the resulting solids by addition of acid, followed by mixing of the redissolved undesirable metals with another liquid, and followed by disposal of said another liquid mixed with the re-dissolved undesirable metals. In one embodiment, undesirable metals are removed from a liquid resource through precipitation by addition of base, oxidant, or combinations thereof, followed by removal of the resulting solids from the liquid resource, followed by redissolution of the resulting solids (via precipitation of the undesirable metals) by addition of acid, followed by mixing of the redissolved undesirable metals with waste water, and followed by disposal of the waste water. In one embodiment, redissolved undesirable metals may be mixed with raffinate, waste water, liquid resource, water, or other liquids. In one embodiment, redissolved undesirable metals may be mixed with raffinate, waste water, liquid resource, water, or other liquids for disposal. In one embodiment, solids of undesirable metals may be dissolved in raffinate, waste water, liquid resource, water, or other liquids for disposal. In one embodiment, undesirable metals may be mixed with raffinate, waste water, liquid resource, water, or other liquids for disposal.

In one embodiment, metals such as iron, manganese, lead, zinc, and/or other metals are precipitated from the liquid resource (e.g., brine) by adding at least one base and optionally at least one oxidant to the liquid resource, wherein the precipitated metals are separated from the liquid resource to form a feed liquid, lithium is recovered from the feed liquid to form a raffinate, and then the precipitated metals are dissolved into the raffinate for reinjection. In one embodiment, the precipitated metals are separated from the liquid resource using filtration, gravity sedimentation, centrifugal sedimentation, magnetic fields, other methods of solid-liquid separation, or combinations thereof. In one embodiment, the raffinate is reinjected underground for disposal, wherein the raffinate is reinjected into the original reservoir from where the liquid resource was obtained, and/or into a different reservoir than from where the liquid resource was obtained.

In one embodiment, undesirable metals are removed from the liquid resource using ion exchange materials. In one embodiment, the undesirable metals are eluted from ion exchange materials using acid, salt solution, or combinations thereof. In one embodiment, the undesirable metals are separated from the eluate using nano-filtration membranes, precipitation, or combinations thereof. In one embodiment, undesirable metals or other metals are eluted from ion exchange materials using a solution of sodium chloride, wherein the metals (undesirable metals or other metals) are removed from the eluate using nano-filtration membranes, such that the eluate with metals removed can be reused to elute metals from the ion exchange materials. In one embodiment, nano-filtration membranes produce a retentate containing dissolved metals that can be separated and reinjected into a reservoir. In one embodiment, nano-filtration membranes produce a retentate containing dissolved metals that can be mixed with a processed liquid resource (e.g., raffinate as described herein), liquid resource, water, waste water, another liquid, or combinations thereof.

In one embodiment, the precipitated and/or separated undesirable metals are dissolved into the raffinate using at least one acid. In one embodiment, the precipitated and/or separated undesirable metals are dissolved into the raffinate using hydrochloric acid and/or sulfuric acid. In one embodiment, the undesirable metals are precipitated from the liquid resource using at least one base. In one embodiment, the undesirable metals are precipitated from the liquid resource using sodium hydroxide, calcium oxide, and/or calcium hydroxide. In one embodiment, the acid is produced using an electrochemical cell, an electrochemical membrane cell, an electrolytic cell, or combinations thereof. In one embodiment, the acid is produced by combusting sulfur. In one embodiment, the base is produced using an electrochemical cell, an electrochemical membrane cell, an electrolytic cell, or combinations thereof. In one embodiment, the base is produced by roasting lime. In one embodiment, the acid and base are both produced using an electrochemical cell, an electrochemical membrane cell, an electrolytic cell, or combinations thereof.

In one embodiment, undesirable metals such as iron, manganese, lead, zinc, or other metals are precipitated from the liquid resource by adding at least one base and optionally at least one oxidant to the liquid resource, wherein the precipitated metals are separated from the liquid resource to form a feed liquid, desirable metals are recovered from the feed liquid to form a raffinate, and then the undesirable metals are dissolved into the raffinate for disposal (e.g., reinjection into a reservoir underground, such as the reservoir from where the liquid resource was obtained from). In one embodiment, metals (undesirable metals or other metals) are precipitated using at least one chemical precipitate such as hydroxide, phosphates, sulfides, and/or other chemicals. In one embodiment, at least one oxidant is used to facilitate precipitation of the undesirable metals, wherein the at least one oxidant includes hydrogen peroxide, air, oxygen, and/or other oxidants. In one embodiment, at least one flocculant is used to agglomerate precipitates to facilitate solid-liquid separation. In one embodiment, precipitated undesirable metals are agglomerated using flocculants, coagulants, or combinations thereof to facilitate separation of the precipitated undesirable metals from the liquid resource. In one embodiment, the precipitated metals are separated from the liquid resource using filtration, gravity sedimentation, centrifugal sedimentation, magnetic fields, other methods of solid-liquid separation, or combinations thereof. In one embodiment, the raffinate is reinjected underground for disposal, wherein the raffinate is reinjected into the original reservoir of the liquid resource, and/or into a different reservoir of the liquid resource.

In some embodiments, the liquid resource is processed to remove metals to facilitate recovery of other metals. In some embodiments, the liquid resource is processed to remove metals (e.g., undesirable metals) to facilitate recovery of other metals such as lithium, manganese, zinc, lead, iron, gold, platinum, rubidium, or other metals. In some embodiments, the liquid resource is processed to remove undesirable metals, forming a feed liquid, to facilitate recovery of desirable metals from said feed liquid, and after recovery of the desirable metals, thereby forming a raffinate, the undesirable metals are redissolved in said raffinate to form a raffinate mixture. In some embodiments, the undesirable metals are redissolved in the raffinate, forming a raffinate mixture, which is injected underground for disposal. In some embodiments, the undesirable metals are redissolved in the raffinate and injected underground for disposal into the reservoir from which they originated. In some embodiments, the undesirable metals are redissolved in the raffinate and injected underground for disposal into a reservoir different from the reservoir in which they originated.

In some embodiments, undesirable metals or transition metals are precipitated from a liquid resource, and then redissolved in a processed liquid resource (e.g., raffinate as described herein), liquid resource, water, waste water, another liquid, or combinations thereof by combining the precipitates with acid to form a concentrated solution and then mixing the concentrated solution with the processed liquid resource (e.g., raffinate), liquid resource, water, waste water, another liquid, or combinations thereof. In some embodiments, undesirable metals or transition metals are precipitated from a liquid resource and then redissolved in a processed liquid resource (e.g., raffinate as described herein), liquid resource, water, waste water, another liquid, or combinations thereof by combining the precipitates with the processed liquid resource (e.g., raffinate as described herein), liquid resource, water, waste water, another liquid, or combinations thereof, to form a mixture, and then adding acid to said mixture.

In some embodiments, different sets of undesirable metals are precipitated from and separated from the liquid resource at different pH ranges. In some embodiments, Fe and Mn are precipitated and separated from the liquid resource at different pH points. In some embodiments, Fe and Mn are precipitated and separated from the liquid resource at one pH range, and Pb and Zn are precipitated and separated from the liquid resource at another pH range. In some embodiments, Fe and Mn are precipitated and separated from the liquid resource at one pH range, and Pb is precipitated and separated from the liquid resource at another pH range.

Recovery of Desirable Metals Using Ion Exchange Materials

In one embodiment, lithium is recovered from a liquid resource, such as a brine, using an ion exchange material. In one embodiment of the ion exchange system, one or more ion exchange columns are loaded with a fixed or fluidized bed of ion exchange material. In one embodiment of the system, the ion exchange column is a cylindrical construct with entry and exit ports. In a further embodiment, the ion exchange column is optionally a non-cylindrical construct with entry and exit ports. In a further embodiment, the ion exchange column is a tank. In a further embodiment, the ion exchange column optionally has entry and exit ports for brine pumping, and additional doors or hatches for loading and unloading ion exchange material to and from the column. In a further embodiment, the ion exchange column is optionally equipped with one or more security devices to decrease the risk of loss, spilling, or theft of the ion exchange material. The material can reversibly absorb lithium from brine and release lithium in acid. In one embodiment, the ion exchange material is comprised of particles that are optionally protected with coating material such as $SiO_2$, $ZrO_2$, or $TiO_2$ to limit dissolution or degradation of the ion exchange material. In one embodiment, the ion exchange material may be in the form of a powder. In one embodiment, the material may be in the form of beads. In one embodiment, the beads contain a structural component such as an acid-resistant polymer that binds the ion exchange materials. In one embodiment, the beads contain pores that facilitate penetration of brine, acid, aqueous, and other solutions into the beads to deliver lithium and hydrogen to and from the bead or to wash the bead. In one embodiment, the bead pores are structured to form a connected network of pores with a distribution of pore sizes and are structured by incorporating filler materials during bead formation and later removing that filler material in a liquid or gas.

In one embodiment of the ion exchange system, the system is a recirculating batch system, which comprises an ion exchange column that is connected to one or more tanks for mixing base into the brine, settling out any precipitates following base addition, and storing the brine prior to reinjection into the ion exchange column or the other tanks. In one embodiment of the recirculating batch system, the brine is loaded into one or more tanks, pumped through the ion exchange column, pumped through a series of tanks, and then returned to the ion exchange column in a loop. In one embodiment, the brine optionally traverses this loop repeatedly. In one embodiment, the brine is recirculated through the ion exchange column to enable optimal lithium uptake by the material. In one embodiment, base is added to the brine in such a way that pH is maintained at an adequate level for lithium uptake and in such a way that the amount of base-related precipitates in the ion exchange column is minimized.

In one embodiment, the ion exchange material is selected from the group consisting of $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof wherein x is from 0.1-10 and y is from 0.1-10. In one embodiment, the ion exchange material comprises coated ion exchange particles, uncoated ion exchange particles or combinations thereof. In a further one aspect, a coating material comprises a polymer. In an embodiment, the coating material comprises a chloro-polymer, a fluoro-polymer, a chloro-fluoro-polymer, a hydrophilic polymer, a hydrophobic polymer, co-polymers thereof, mixtures thereof, or combinations thereof.

In some embodiments, the coating material comprises a carbide, a nitride, an oxide, a phosphate, a fluoride, a polymer, carbon, a carbonaceous material, or combinations thereof. In some embodiments, the coating material comprises $Nb_2O_5$, $Ta_2O_5$, $MoO_2$, $TiO_2$, $ZrO_2$, $MoO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, the coating material comprises polyvinylidene difluoride, polyvinyl chloride, a fluoro-polymer, a chloro-polymer, or a fluoro-chloro-polymer. In some embodiments, the coating material comprises $TiO_2$, $ZrO_2$, $SiO_2$ $MoO_2$, $Li_2TiO_3$, $Li_2ZrO_3$, $Li_2MnO_3$, $ZrSiO_4$, or $LiNbO_3$, $AlF_3$, SiC, graphitic carbon, amorphous carbon, diamond-like carbon, or combinations thereof. In some embodiments, the coating material comprises $TiO_2$, $SiO_2$, or $ZrO_2$. In some embodiments, the coating material comprises $TiO_2$. In some embodiments, the coating material comprises $SiO_2$. In some embodiments, the coating material comprises $ZrO_2$.

In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof.

In a further aspect, a coating material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion®), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof.

In a further aspect, a coating material comprises polyvinylidene fluoride (PVDF), polyvinyl chloride (PVC), ethylene chlorotrifluoro ethylene (Halar®), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In one embodiment, the ion exchange material is a porous ion exchange material. In one embodiment, the ion exchange material is in the form of porous beads. In one embodiment, the ion exchange material is in a powder form. In one embodiment, the acid solution is a solution of $H_2SO_4$ or HCl.

In some embodiments, lithium or other metals are recovered from the liquid resource (e.g., brine) using a porous structure for ion exchange comprising: a) a structural support; and b) a plurality of particles selected from coated ion exchange particles, uncoated ion exchange particles, and a combination thereof. In some embodiments, the structural support comprises a polymer, an oxide, a phosphate, or combinations thereof. In some embodiments, the structural support comprises a polymer. In some embodiments, the polymer is polyvinylidene fluoride, polyvinyl fluoride, polyvinyl chloride, polyvinylidene chloride, a chloro-polymer, a fluoro-polymer, a fluoro-chloro-polymer, polyethylene, polypropylene, polyphenylene sulfide, polytetrafluoroethylene, sulfonated polytetrafluoroethylene, polystyrene, polydivinylbenzene, polybutadiene, a sulfonated polymer, a carboxylated polymer, polyacrylonitrile, Nafion®, copolymers thereof, or combinations thereof.

In some embodiments, lithium or other metals are recovered from the brine using a batch, semi-batch, semi-continuous, or continuous process. In some embodiments, ion exchange beads are moved through the system in an opposite direction of the brine.

Solid-Liquid Separation of Precipitates from Liquid Resource

In one embodiment, the precipitated metals are separated from the liquid resource using filtration, gravity sedimentation, centrifugal sedimentation, magnetic fields, other methods of solid-liquid separation, or combinations thereof. In some embodiments, precipitated metals are removed from the liquid resource using a filter. In some embodiments, the filter comprises a belt filter, plate-and-frame filter press, pressure vessel containing filter elements, rotary drum filter, rotary disc filter, cartridge filter, a centrifugal filter with a fixed or moving bed, a metal screen, a perforate basket centrifuge, a three-point centrifuge, a peeler type centrifuge, a pusher centrifuge, or combinations thereof. In some embodiments, the filter uses a scroll and/or a vibrating device. In some embodiments, the filter is horizontal, vertical, and/or may use a siphon.

In some embodiments, a filter cake is prevented, limited, or removed by using gravity, centrifugal force, an electric field, vibration, brushes, liquid jets, scrapers, intermittent reverse flow, vibration, crow-flow filtration, and/or pumping suspensions across the surface of the filter. In some embodiments, the precipitated metals and a liquid are moved tangentially to the filter to limit cake growth. In some embodiments, gravitational, magnetic, centrifugal sedimentation, and/or other means of solid-liquid separation are used before, during, and/or after filtering to prevent cake formation.

In some embodiments, a filter comprises a screen, a metal screen, a sieve, a sieve bend, a bent sieve, a high frequency electromagnetic screen, a resonance screen, or combinations thereof. In some embodiments, one or more particle traps are a solid-liquid separation apparatus.

In some embodiments, one or more solid-liquid separation apparatuses may be used in series or parallel. In some embodiments, a dilute slurry of precipitated metals is removed from a tank, transferred to an external solid-liquid separation apparatus, and separated into a concentrated slurry and a solution with low or no suspended solids. In some embodiments, the concentrated slurry of precipitated metals is returned to the tank or transferred to a different tank. In some embodiments, the precipitated metals are transferred from a liquid resource tank to another liquid resource tank, from an acid tank to another acid tank, from a washing tank to another washing tank, from a liquid resource tank to a washing tank, from a washing tank to an acid tank, from an acid tank to a washing tank, or from an acid tank to a liquid resource tank.

In some embodiments, solid-liquid separation apparatuses for separating precipitates from a liquid resource use gravitational sedimentation. In some embodiments, solid-liquid separation apparatuses include a settling tank, a thickener, a clarifier, a gravity thickener. In some embodiments, solid-liquid separation apparatuses are operated in batch mode, semi-batch mode, semi-continuous mode, or continuous mode. In some embodiments, solid-liquid separation apparatuses include a circular basin thickener with the slurry of precipitated metals entering through a central inlet, such that the slurry is dispersed into the thickener with one or more raking components that rotate and concentrate the ion exchange particles into a zone where the particles can leave through the bottom of the thickener.

In some embodiments, solid-liquid separation apparatuses include a deep cone, a deep cone tank, a deep cone compression tank, or a tank wherein the slurry is compacted by weight. In some embodiments, solid-liquid separation apparatuses include a tray thickener with a series of thickeners oriented vertically with a center axle and raking components. In some embodiments, solid-liquid separation apparatuses include a lamella type thickener with inclined plates and/or tubes that may be smooth, flat, rough, or corrugated. In some embodiments, solid-liquid separation apparatuses include a gravity clarifier that may be a rectangular basin with feed at one end and overflow at the opposite end optionally with paddles and/or a chain mechanism to move particles. In some embodiments, the solid-liquid separation apparatuses may be a particle trap.

In some embodiments, the solid-liquid separation apparatuses use centrifugal sedimentation. In some embodiments, solid-liquid separation apparatuses include a tubular centrifuge, a multi-chamber centrifuge, a conical basket centrifuge, a scroll-type centrifuge, a sedimenting centrifuge, and/or a disc centrifuge. In some embodiments, precipitated metals are discharged continuously or intermittently from the centrifuge. In some embodiments, the solid-liquid separation apparatus is a hydrocyclone. In some embodiments, solid-liquid separation apparatus is an array of hydrocyclones or centrifuges in series and/or in parallel. In some embodiments, sumps are used to reslurry the precipitated metals. In some embodiments, the hydrocyclones may have multiple feed points. In some embodiments, a hydrocyclone is used upside down. In some embodiments, liquid is injected near the apex of the cone of a hydrocyclone to improve sharpness of cut. In some embodiments, a weir rotates in the center of the particle trap with a feed of slurry of precipitated metals entering near the middle of the apparatus, wherein the precipitated metals get trapped at the bottom and center of the apparatus due to a "teacup effect".

Base and Acid Generation

In one embodiment, at least one base is used to precipitate undesirable metals from the liquid resource, wherein the precipitated metals are separated from the liquid resource, and then the precipitated metals are redissolved into a processed liquid resource (e.g., raffinate as described herein), liquid resource, water, waste water, another liquid, or combinations thereof using at least one acid. In one embodiment, the acid and base are generated using an electrochemical cell. In one embodiment, the acid and base are generated using electrodes. In one embodiment, the acid and base are generated using a membrane. In some embodiments, said membrane comprises an ion-conducting membrane.

In one embodiment, said ion-conducting membrane is a cation-conducting membrane, an anion-conducting membrane or combinations thereof. In one embodiment, said ion-conducting membrane comprises sulfonated tetrafluoroethylene-based fluoropolymer-copolymer, sulfonated tetrafluoroethylene, sulfonated fluoropolymer, MK-40, co-polymers, or combinations thereof. In one embodiment, said anion-conducting membrane comprises a functionalized polymer structure.

In one embodiment, said functionalized polymer structure comprises polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment, said cation-conducting membrane allows for transfer of lithium ions but prevents transfer of anion groups. In one embodiment, said ion-conducting membrane has a thickness from about 1 μm to about 1000 μm. In one embodiment, said ion-conducting membrane has a thickness from about 1 mm to about 10 mm.

In one embodiment, said electrodes are comprised of titanium, niobium, zirconium, tantalum, magnesium, titanium dioxide, oxides thereof, or combinations thereof. In one embodiment, said electrodes further comprise a coating of platinum, $TiO_2$, $ZrO_2$, $Nb_2O_5$, $Ta_2O_5$, $SnO_2$, $IrO_2$, $RuO_2$, mixed metal oxides, graphene, derivatives thereof, or combinations thereof.

In one embodiment of an integrated system, a chlor-alkali setup is used to generate HCl and NaOH from an aqueous NaCl solution. In one embodiment, the HCl is used to elute lithium from an ion exchange system for selective lithium uptake to produce a lithium eluate solution. In one embodiment, the NaOH from the chlor-alkali setup is used to control the pH of the brine in the ion exchange system for selective lithium uptake. In one embodiment, the NaOH is used to precipitate impurities from a lithium eluate solution.

In one embodiment, the system includes one or more electrochemical or electrolysis systems. The terms "electrochemical" and "electrolysis" are used interchangeably in the present specification and these terms are synonymous unless specifically noted to the contrary. In one embodiment, an electrolysis system is comprised of one or more electrochemical cells. In one embodiment, an electrochemical system is used to produce HCl and NaOH. In one embodiment, an electrochemical system converts a salt solution into acid in base. In one embodiment, an electrochemical system converts a salt solution containing NaCl, KCl, and/or other chlorides into a base and an acid. In one embodiment, a salt solution precipitated or recovered from the liquid resource (e.g., brine) is fed into an electrochemical system to produce acid and base. In one embodiment, an electrolysis system converts a lithium salt solution to form a lithium hydroxide solution, an acidified solution, and optionally a dilute lithium salt solution. In one embodiment, the lithium salt solution is or is derived from a lithium eluate solution, produced by an ion exchange system that has optionally been concentrated and/or purified. In one embodiment, acidified solution from an electrolysis system is returned to an ion exchange system to elute more lithium eluate solution.

In one embodiment of the integrated system, the integrated system includes one or more electrolysis systems. In one embodiment, an electrolysis system is comprised of one or more electrodialysis cells. In one embodiment, an electrolysis system converts a lithium salt solution to form a lithium hydroxide solution, an acidified solution, and optionally a dilute lithium salt solution. In one embodiment, the lithium salt solution is or is derived from a lithium eluate solution, produced by an ion exchange system that has optionally been concentrated and/or purified. In one embodiment, acidified solution from an electrolysis system is returned to an ion exchange system to elute more lithium eluate solution.

In one embodiment, a lithium salt solution contains unreacted acid from the ion exchange system. In one embodiment, unreacted acid in the lithium salt solution from an ion exchange system passes through an electrolysis system and is further acidified to form an acidified solution. In one embodiment, a lithium salt solution derived from an ion exchange system is purified to remove impurities without neutralizing the unreacted acid in the lithium salt solution and is then fed into an electrolysis system.

In one embodiment, an acidified solution produced by an electrolysis system contains lithium ions from the lithium salt solution fed into the electrolysis system. In one embodiment, an acidified solution containing lithium ions leaves the electrolysis system and is fed back to an ion exchange system to elute lithium and produce more lithium salt solution.

In one embodiment of an electrolysis system, the electrolysis cells are electrochemical cells. In one embodiment of an electrochemical cell, the membranes may be cation-conducting and/or anion-conducting membranes. In one embodiment, the electrochemical cell is a two-compartment cell with a cation-conducting membrane that allows for transfer of lithium ions between the chambers but prevents transfer of anion groups such as chloride, sulfate, and hydroxide groups.

In one embodiment of an electrolysis system, the electrolysis cells are electrodialysis cells. In one embodiment of an electrodialysis cell, the membranes may be cation-conducting and/or anion-conducting membranes. In one embodiment, the electrodialysis cell is a two-compartment cell with a cation-conducting membrane that allows for transfer of lithium ions between the chambers but prevents transfer of anion groups such as chloride, sulfate, and hydroxide groups.

In one embodiment of an electrolysis system, the electrolysis cells are membrane electrolysis cells. In one embodiment of a membrane electrolysis cell, the membranes may be cation-conducting and/or anion-conducting membranes. In one embodiment, the membrane electrolysis cell is a two-compartment cell with a cation-conducting membrane that allows for transfer of lithium ions between the chambers but prevents transfer of anion groups such as chloride, sulfate, and hydroxide groups.

In one embodiment, the membrane electrolysis cell is a three-compartment cell with a cation-conducting membrane that allows for transfer of lithium ions separating a compartment with an electrochemically reducing electrode from a central compartment and with an anion-conducting membrane that allows for transfer of anions ions separating a compartment with an electrochemically oxidizing electrode from the central compartment. In one embodiment, the cation-conducting membrane prevents transfer of anions such as chloride, sulfate, or hydroxide. In one embodiment, the anion-conducting membrane prevents transfer of cations such as lithium, sodium, or protons.

In one embodiment of the membrane electrolysis cell, the membranes may be comprised of Nafion®, sulfonated tetrafluoroethylene, sulfonated fluoropolymer, MK-40, co-polymers, other membrane materials, composites, or combinations thereof. In one embodiment of the membrane electrolysis cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the membrane electrolysis cell, the polymer structures of the cation exchange membrane are functionalized with sulfone groups, carboxylic acid groups, phosphate groups, other negatively charged functional groups, or combinations thereof.

In one embodiment of the electrochemical cell, the membranes may be comprised of Nafion®, sulfonated tetrafluoroethylene, sulfonated fluoropolymer, MK-40, co-polymers, other membrane materials, composites, or combinations thereof. In one embodiment of the electrochemical cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the electrochemical cell, the polymer structures of the cation exchange membrane are functionalized with sulfone groups, carboxylic acid groups, phosphate groups, other negatively charged functional groups, or combinations thereof.

In one embodiment of the electrodialysis cell, the membranes may be comprised of Nafion®, sulfonated tetrafluoroethylene, sulfonated fluoropolymer, MK-40, co-polymers, other membrane materials, composites, or combinations thereof. In one embodiment of the electrodialysis cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the electrodialysis cell, the polymer structures of the cation exchange membrane are functionalized with sulfone groups, carboxylic acid groups, phosphate groups, other negatively charged functional groups, or combinations thereof.

In one embodiment of the membrane electrolysis cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the electrochemical cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the electrodialysis cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the membrane electrolysis cell, the membrane may have a thickness of less than 10 µm, less than 50 µm, less than 200 µm, less than 400 µm, or less than 1,000 µm. In one embodiment of the membrane electrolysis cell, the membranes may have a thickness of greater than 1,000 µm. In one embodiment of the membrane electrolysis cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment of the electrochemical cell, the membrane may have a thickness of less than 10 µm, less than 50 µm, less than 200 µm, less than 400 µm, or less than 1,000 µm. In one embodiment of the electrochemical cell, the membranes may have a thickness of greater than 1,000 µm. In one embodiment of the electrochemical cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment of the electrodialysis cell, the membrane may have a thickness of less than 10 µm, less than 50 µm, less than 200 µm, less than 400 µm, or less than 1,000 µm. In one embodiment of the electrodialysis cell, the membranes may have a thickness of greater than 1,000 µm. In one embodiment of the electrodialysis cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment, an electrolysis system contains electrolysis cells that may be two-compartment electrolysis cells or three-compartment electrolysis cells.

In one embodiment of a two-compartment electrolysis cell, the cell contains a first compartment that contains an electrochemically oxidizing electrode. A lithium salt solution enters the first compartment and is converted into an acidified solution. In one embodiment of a two-compartment electrolysis cell, the cell contains a second compartment containing an electrochemically reducing electrode. This second compartment takes as an input a water or dilute LiOH solution, and produces as an output a more concentrated LiOH solution. In one embodiment, the compartments are separated by a cation-conducting membrane that limits transport of anions.

In one embodiment of a three-compartment electrolysis cell, the cell contains a first compartment containing an electrochemically oxidizing electrode. The first compartment takes as an input water or a dilute salt solution, and produces as an output an acidified solution. In one embodiment of a three-compartment electrolysis cell, the cell contains a second compartment containing an electrochemically reducing electrode. This second compartment takes as an input a water or dilute hydroxide solution, and produces as an output a more concentrated hydroxide solution. In one embodiment of a three-compartment electrolysis cell, the cell contains a third compartment containing no electrode, which is located between the first and second compartment, and takes as an input a concentrated lithium salt solution, and produces as an output a dilute lithium salt solution. In one embodiment, the first and the third compartments are separated by an anion-conducting membrane that limits transport of cations. In one embodiment, the second and the third compartments are separated by a cation-conducting membrane that limits transport of anions.

In one embodiment of the electrolysis cell, the electrodes may be comprised of titanium, niobium, zirconium, tantalum, magnesium, titanium dioxide, oxides thereof, or combinations thereof. In one embodiment of the electrolysis cell, the electrodes may be coated with platinum, $TiO_2$, $ZrO_2$, $Nb_2O_5$, $Ta_2O_5$, $SnO_2$, $IrO_2$, $RuO_2$, $PtO_x$, mixed metal oxides, graphene, derivatives thereof, or combinations thereof. In one embodiment of the electrolysis cell, the electrodes may be comprised of steel, stainless steel, nickel, nickel alloys, steel alloys, or graphite.

In one embodiment of the electrolysis system, the lithium salt solution is a LiCl solution optionally containing HCl. In one embodiment of the electrolysis system, the electrochemically oxidizing electrode oxides chloride ions to produce chlorine gas.

In one embodiment of the electrolysis system, the lithium salt solution is a $Li_2SO_4$ solution optionally containing $H_2SO_4$. In one embodiment of the electrolysis system, the electrochemically oxidizing electrode oxidizes water, hydroxide, or other species to produce oxygen gas.

In one embodiment of the electrolysis system, the electrochemically reducing electrode reduces hydrogen ions to produce hydrogen gas. In one embodiment of the electrolysis system, the chamber containing the electrochemically reducing electrode produces a hydroxide solution or increases the hydroxide concentration of a solution.

In one embodiment of the electrolysis system, chlorine and hydrogen gas are burned to produce HCl in an HCl burner. In one embodiment, the HCl burner is a column maintained at approximately 100-300 or 300-2,000 degrees Celsius. In one embodiment, HCl produced in the HCl burner is cooled through a heat exchange and absorbed into water in an absorption tower to produce aqueous HCl solution. In one embodiment, the HCl solution produced from the HCl burner is used to elute lithium from an ion exchange system.

In one embodiment, the pH of the acidified solution leaving the electrolysis cell may be 0 to 1, −2 to 0, 1 to 2, less than 2, less than 1, or less than 0. In some embodiments, the membrane electrolysis cell is an electrodialysis cell with multiple compartments. In some embodiments, the electrodialysis cell may have more than about two, more than about five, more than about 10, or more than about twenty compartments.

In one embodiment, NaCl is recovered from the liquid resource by removing water therefrom, and then cooling said liquid resource. In one embodiment, water is removed from the liquid resource by reducing pressure, distillation, or combinations thereof. In one embodiment, water is removed from the liquid resource using any separation process described herein and/or distillation. In one embodiment, NaCl is recovered from the liquid resource by removing water therefrom, cooling said liquid resource, or combinations thereof.

In one embodiment, the base added to precipitate metals from the liquid resource may be calcium hydroxide or sodium hydroxide. In one embodiment, the calcium hydroxide or sodium hydroxide is produced as described herein. In one embodiment, the base may be added to the liquid resource as an aqueous solution with a base concentration that may be less than 1 N, 1-2 N, 2-4 N, 4-10 N, 10-20 N, or 20-40 N. In one embodiment, the base may be added to the liquid resource as a solid.

In one embodiment, the acid may be added to the precipitated metals to dissolve the precipitated metals before mixing the redissolved metals with a processed liquid resource (e.g., raffinate), liquid resource, water, waste water, another liquid, or combinations thereof. In one embodiment, the acid may be added to the liquid resource to acidify the liquid resource, and the precipitated metals may be combined with the acidified liquid resource to redissolve the precipitated metals. In one embodiment, the acid is produced as described herein.

Downstream Processing

In one embodiment, metals recovered from a liquid resource may be further processed downstream to produce high purity liquids and solids. In one embodiment, metals recovered from the liquid resource may be purified with ion exchange, solvent extraction, membranes, filtration, or other purification technologies. In one embodiment, metals may be converted from a dissolved form to a solid form. In one embodiment, metals may be converted using precipitation, electrolysis, electrowinning, chelation, or crystallization.

In one embodiment, lithium may be converted from lithium chloride or lithium sulfate to lithium carbonate or lithium hydroxide. In one embodiment, lithium may be purified by precipitating multivalent metals using sodium carbonate, by removing multivalent metals using ion exchange, by removing boron using ion exchange, by removing impurities using membranes, by removing impurities using solvent extraction, or combinations thereof. In one embodiment, lithium may be converted from lithium chloride or lithium sulfate solution to a lithium carbonate solid by addition of sodium carbonate, sodium carbonate solution, carbon dioxide, sodium hydroxide, or combinations thereof. In one embodiment, lithium may be converted form lithium sulfate to lithium hydroxide by addition of sodium hydroxide, crystallization of sodium sulfate, and then crystallization of lithium hydroxide. In one embodiment, lithium may be converted from lithium carbonate to lithium hydroxide by addition of calcium hydroxide.

EXAMPLES

Example 1: Transition Metal Separation, Lithium Recovery, and Transition Metal Redissolution FIG. 1 depicts an exemplary flowchart for separating transition metals from a liquid resource for a lithium recovery process described herein. A liquid resource (e.g., raw brine (102)) is pumped from a geothermal reservoir. The raw brine contains 50,000 mg/L Na, 50,000 mg/L Ca, 200 mg/L Li, 1,000 mg/L Fe, 800 mg/L Mn, 50 mg/L Pb, and other dissolved metals. An electrochemical cell (not shown) is used to convert NaCl into aqueous solutions of HCl and NaOH. The aqueous NaOH (104) is added to the brine to precipitate (106) Fe, Mn, and Pb, such that the raw brine becomes a slurry (108) comprising precipitates. The precipitates are separated from the raw brine using a flocculant and a gravity sedimentation tank (110) to form a feed liquid (feed brine (112)) and a concentrated slurry (120) containing the precipitates. The feed brine (112) contains <5 mg/L Fe, <10 mg/L Mn, and <10 mg/L Pb. The feed brine is processed (114) to recover lithium by contacting the feed brine with an ion exchange material, which selectivity absorbs the lithium. The lithium depleted brine is now a raffinate (e.g., spent brine 116). After lithium recovery, the HCl solution (118) is added to the concentrated slurry (120) containing the precipitates to redissolve (122) the precipitates. Then the redissolved metals (redissolved precipitates) are mixed with the raffinate 116 to form a raffinate mixture that is reinjected (124) into the geothermal reservoir.

Figure 2:
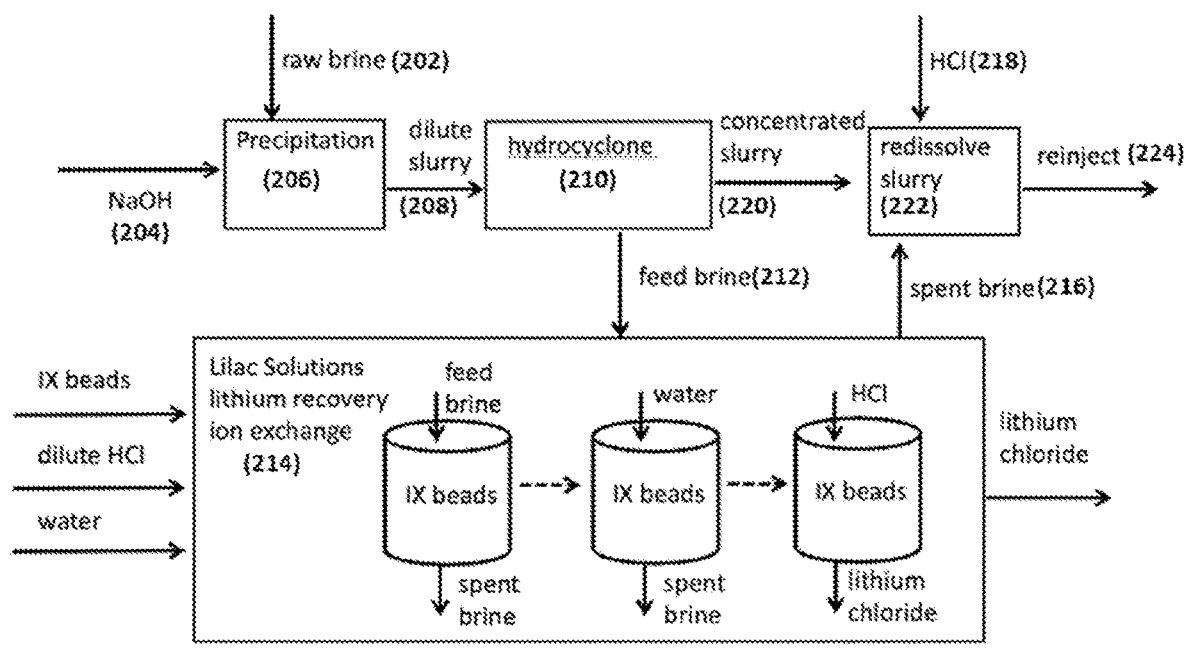
FIG. 2 illustrates a system for precipitating undesirable metals from a liquid resource, separating precipitated undesirable metals from the liquid resource using a hydrocyclone, recovering desirable metals from the liquid resource, and redissolving the undesirable metals in the liquid resource.

Example 2: Transition Metal Separation Using a Hydrocyclone, Lithium Recovery, and Transition Metal Redissolution FIG. 2 depicts an exemplary flowchart for separating transition metals from a liquid resource using a hydrocyclone for a lithium recovery process described herein. A liquid resource (e.g., raw brine (202)) is pumped from a geothermal reservoir. The raw brine contains 80,000 mg/L Na, 30,000 mg/L Ca, 300 mg/L Li, 1,500 mg/L Fe, 1,200 mg/L Mn, and other dissolved metals. NaCl is recovered from the raw brine by removing water and cooling the brine (not shown). An electrochemical cell (not shown) is used to convert the NaCl into aqueous solutions of HCl and NaOH. The aqueous NaOH (204) is added to the raw brine to precipitate (206) Fe and Mn, such that the raw brine becomes a slurry (208) comprising precipitates. The precipitates are separated from the raw brine using a hydrocyclone (210) to form a feed liquid (feed brine (212)) and a concentrated slurry (220) containing the precipitates. The feed brine (212) contains 2 mg/L Fe and 5 mg/L Mn. The feed brine is processed (214) to recover lithium by contacting the feed brine with an ion exchange material, which selectivity absorbs the lithium in an ion exchange column. The lithium depleted brine is now a raffinate (e.g., spent brine 216). After lithium recovery, the concentrated slurry (220) containing the precipitates are added to the raffinate (216) and HCl (218) is added to the resulting mixture to redissolve (222) the precipitates into the raffinate, forming a raffinate mixture. The raffinate mixture is then reinjected (224) into the geothermal reservoir.

Figure 3:
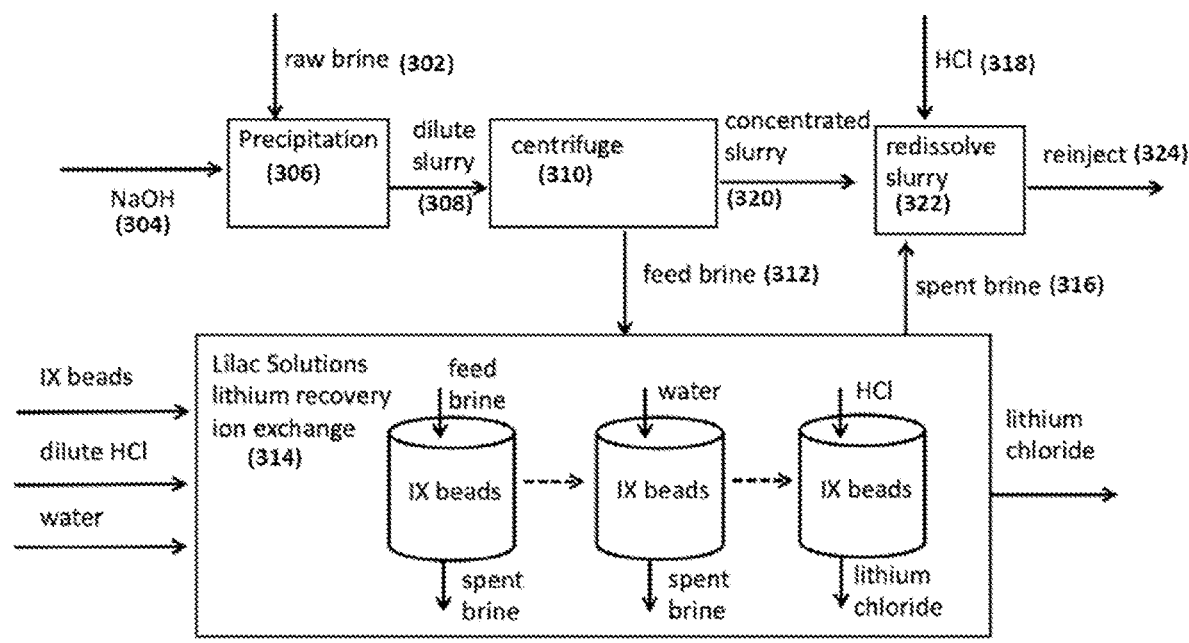
FIG. 3 illustrates a system for precipitating undesirable metals from a liquid resource, separating precipitated undesirable metals from the liquid resource using a centrifuge, recovering desirable metals from the liquid resource, and redissolving the undesirable metals in the liquid resource.

Example 3: Transition Metal Separation Using a Centrifuge, Lithium Recovery, and Transition Metal Redissolution FIG. 3 depicts an exemplary flowchart for separating transition metals from a liquid resource using a centrifuge for a lithium recovery process described herein. A liquid resource (e.g., raw brine (302)) is pumped from a geothermal reservoir. The raw brine contains 60,000 mg/L Na, 40,000 mg/L Ca, 200 mg/L Li, 1,800 mg/L Fe, 1,000 mg/L Mn, and other dissolved metals. An electrochemical cell (not shown) is used to convert the NaCl into aqueous solutions of HCl and NaOH. The aqueous NaOH (304) is added to the raw brine to precipitate (306) Fe and Mn such that the raw brine becomes a slurry (308) comprising precipitates. The precipitates are separated from the raw brine using a centrifuge to form a feed liquid (feed brine (312)) and a concentrated slurry (320) containing the precipitates. The feed brine (312) contains 200 mg/L Li, 2 mg/L Fe, and 6 mg/L Mn. The feed brine is processed (314) to recover lithium by contacting the feed brine with an ion exchange material, which selectivity absorbs the lithium in an ion exchange column. The feed brine is depleted of lithium to form a raffinate (e.g., spent brine (316)). HCl (318) is added to the concentrated slurry (320) to redissolve (322) the precipitates forming a transition metal concentrate, which is then mixed with the spent brine (316) to form a raffinate mixture. The raffinate mixture containing the redissolved transition metals is then reinjected (324) into the geothermal reservoir.

Exemplary Aspects for Separating Undesirable Metals from a Liquid Resource

In one aspect, disclosed herein is a process for recovering a desirable metal from a liquid resource, the process comprising: a) precipitating an undesirable metal from the liquid resource to form an undesirable metal precipitate; b) separating said undesirable metal precipitate from the liquid resource to form a feed liquid; c) recovering said desirable metal from the feed liquid to form a raffinate; and d) redissolving said undesirable metal precipitate into said raffinate to form a raffinate mixture. In some embodiments, said recovering comprises contacting said feed liquid with ion exchange particles that absorb said desirable metals while releasing protons. In some embodiments, said desirable metal comprises lithium. In some embodiments, said undesirable metal comprises a transition metal. In some embodiments, said desirable metals comprise lithium and said recovering is done by contacting said feed liquid with ion exchange particles that absorb said desirable metals while releasing protons. In some embodiments, said undesirable metals comprise transition metals and said recovering is done by contacting said feed liquid with ion exchange particles that absorb said desirable metals while releasing protons. In some embodiments, said desirable metals comprise lithium, said undesirable metals comprise transition metals, and said recovering is done by contacting said feed liquid with ion exchange particles that absorb said desirable metals while releasing protons. In some embodiments, said precipitating comprises adding a base to the liquid resource. In some embodiments, said precipitating comprises adding a base and/or an oxidant to the liquid resource. In some embodiments, said precipitating comprises adding NaOH and/or $Ca(OH)_2$ to the liquid resource. In some embodiments, said precipitating comprises adding air and/or hydrogen peroxide to the liquid resource. In some embodiments, said redissolving comprises combining an acid with said undesirable metal precipitate. In some embodiments, said combining an acid with said undesirable metal precipitate occurs 1) prior to combining said undesirable metal precipitate with said raffinate, or 2) after combining said undesirable metal precipitate with said raffinate. In some embodiments, the acid comprises hydrochloric acid and/or sulfuric acid. In some embodiments, said redissolving comprises adding hydrochloric acid or sulfuric acid to dissolve said undesirable metal precipitate. In some embodiments, said precipitating comprises adding a base to the liquid resource, and said redissolving comprises combining an acid with the undesirable metal precipitate, wherein said acid and said base are produced with an electrochemical cell. In some embodiments, said acid and/or said base are produced with an electrochemical cell. In some embodiments, the electrochemical cell comprises electrodes and membranes. In some embodiments, said acid and/or said base are produced from a salt solution. In some embodiments, said acid and/or said base are produced by splitting said salt solution. In some embodiments, said salt solution comprises a sodium chloride solution. In some embodiments, said acid and/or said base are produced by processing said sodium chloride solution into a hydrochloric acid solution and/or a sodium hydroxide solution, wherein the hydrochloric acid solution comprises said acid and the sodium hydroxide solution comprises said base. In some embodiments, said process further comprises extracting sodium chloride from the liquid resource to form the sodium chloride solution. In some embodiments, said precipitating comprises adding chemicals to the liquid resource. In some embodiments, said separating of the undesirable metal precipitate comprises filtration, gravity sedimentation, centrifugal sedimentation, magnetic fields, other methods of solid-liquid separation, or any combination thereof. In some embodiments, said separating of the undesirable metal precipitate comprises using a filter, a settling tank, a clarifier, a hydrocyclone, a centrifuge, or combinations thereof. In some embodiments, said separating of the undesirable metal precipitate comprises using a centrifuge. In some embodiments, said process further comprises injecting the raffinate mixture underground. In some embodiments, the liquid resource is obtained from a reservoir. In some embodiments, the liquid resource is pumped out of the reservoir. In some embodiments, said process further comprises injecting the raffinate mixture into said reservoir. In some embodiments, the reservoir is located underground. In some embodiments, said process further comprises agglomerating the undesirable metal precipitate. In some embodiments, said agglomerating comprises adding a flocculant to the liquid resource. In some embodiments, said separating the undesirable metal precipitate comprises using a filter, wherein said filter is a belt filter, plate-and-frame filter press, pressure vessel containing filter elements, rotary drum filter, rotary disc filter, cartridge filter, a centrifugal filter with a fixed or moving bed, a metal screen, a perforate basket centrifuge, a three-point centrifuge, a peeler type centrifuge, a pusher centrifuge, or combinations thereof. In some embodiments, said separating the undesirable metal precipitate further comprises using gravity, centrifugal force, an electric field, vibration, brushes, liquid jets, scrapers, intermittent reverse flow, vibration, crow-flow filtration, and/or pumping suspensions across the surface of the filter. In some embodiments, said separating the undesirable metal precipitate further comprises moving the undesirable metal precipitate and the feed liquid tangentially to the filter. In some embodiments, said separating the undesirable metal precipitate further comprises gravitational, magnetic, centrifugal sedimentation, and/or other means of solid-liquid separation before, during, and/or after filtering. In some embodiments, said process further comprises a plurality of separating processes operated in parallel and/or series. In some embodiments, said precipitating of an undesirable metal forms a slurry comprising the undesirable metal precipitate and feed liquid. In some embodiments, the liquid resource is a natural brine, a dissolved salt flat, seawater, concentrated seawater, a geothermal brine, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the desirable metal is Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals. In some embodiments, the undesirable metal is Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals. In some embodiments, a plurality of undesirable metals are precipitated and separated from the liquid resource, and redissolved into the raffinate. In some embodiments, a plurality of desirable metals are separated from the feed liquid. In some embodiments, the desirable metal is different from the undesirable metal.

In another aspect, disclosed herein is a process for separating an undesirable metal from a liquid resource the process comprising: a) adding a base to said liquid resource to precipitate said undesirable metal thereby forming an undesirable metal precipitate; b) separating said undesirable metal precipitate from the liquid resource to form a feed liquid; c) recovering a desirable metal from the feed liquid; and d) combining an acid to said undesirable metal precipitate to form a solution of redissolved undesirable metals for disposal. In some embodiments, said recovering comprises contacting said feed liquid with ion exchange particles that absorb said desirable metals while releasing protons. In some embodiments, said desirable metal comprises lithium. In some embodiments, said undesirable metal comprises a transition metal. In some embodiments, said process further comprises an oxidant with said base to said liquid resource. In some embodiments, said base comprises NaOH and/or Ca(OH)$_2$ to the liquid resource. In some embodiments, said oxidant comprises air and/or hydrogen peroxide to the liquid resource. In some embodiments, the acid comprises hydrochloric acid and/or sulfuric acid. In some embodiments, said acid and/or said base are produced with an electrochemical cell. In some embodiments, the electrochemical cell comprises electrodes and membranes. In some embodiments, said acid and/or said base are produced from a salt solution. In some embodiments, said acid and/or said base are produced by splitting said salt solution. In some embodiments, the salt solution comprises a sodium chloride solution. In some embodiments, said acid and/or said base are produced by processing said sodium chloride solution into a hydrochloric acid solution and/or a sodium hydroxide solution, wherein the hydrochloric acid solution comprises said acid and the sodium hydroxide solution comprises said base. In some embodiments, said process further comprises extracting sodium chloride from the liquid resource to form the sodium chloride solution. In some embodiments, said separating of the undesirable metal precipitate comprises filtration, gravity sedimentation, centrifugal sedimentation, magnetic fields, other methods of solid-liquid separation, or any combination thereof. In some embodiments, said separating of the undesirable metal precipitate comprises using a filter, a settling tank, a clarifier, a hydrocyclone, a centrifuge, or combinations thereof. In some embodiments, said separating of the undesirable metal precipitate comprises using a centrifuge. In some embodiments, said disposal comprises injecting the solution of redissolved undesirable metals underground. In some embodiments, the liquid resource is obtained from a reservoir. In some embodiments, the liquid resource is pumped out of the reservoir. In some embodiments, said disposal comprises injecting the solution of redissolved undesirable metals into said reservoir. In some embodiments, the reservoir is located underground. In some embodiments, said process further comprises agglomerating the undesirable metal precipitate. In some embodiments, said agglomerating comprises adding a flocculant to the liquid resource. In some embodiments, said separating the undesirable metal precipitate comprises using a filter, wherein said filter is a belt filter, plate-and-frame filter press, pressure vessel containing filter elements, rotary drum filter, rotary disc filter, cartridge filter, a centrifugal filter with a fixed or moving bed, a metal screen, a perforate basket centrifuge, a three-point centrifuge, a peeler type centrifuge, a pusher centrifuge, or combinations thereof. In some embodiments, said separating the undesirable metal precipitate further comprises using gravity, centrifugal force, an electric field, vibration, brushes, liquid jets, scrapers, intermittent reverse flow, vibration, crow-flow filtration, and/or pumping suspensions across the surface of the filter. In some embodiments, said separating the undesirable metal precipitate further comprises moving the undesirable metal precipitate and the feed liquid tangentially to the filter. In some embodiments, said separating the undesirable metal precipitate further comprises gravitational, magnetic, centrifugal sedimentation, and/or other means of solid-liquid separation before, during, and/or after filtering. In some embodiments, said process further comprises a plurality of separating processes operated in parallel and/or series. In some embodiments, said precipitating of an undesirable metal forms a slurry comprising the undesirable metal precipitate and feed liquid. In some embodiments, the liquid resource is a natural brine, a dissolved salt flat, seawater, concentrated seawater, a geothermal brine, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the desirable metal is Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals. In some embodiments, the undesirable metal is Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals. In some embodiments, a plurality of undesirable metals are precipitated and separated from the liquid resource, and redissolved into the raffinate. In some embodiments, a plurality of desirable metals are separated from the feed liquid. In some embodiments, the desirable metal is different from the undesirable metal.

In another aspect, disclosed herein is a process for recovering lithium from a liquid resource: a) precipitating a transition metal from said liquid resource to form a transition metal precipitate; b) separating said transition metal precipitate from the liquid resource to form a feed liquid; c) recovering said lithium from said feed liquid to form a raffinate, wherein said recovering of lithium comprises contacting said feed liquid with ion exchange particles that absorb said lithium while releasing protons; and d) redissolving said transition metal precipitate into said raffinate to form a raffinate mixture. In some embodiments, said precipitating comprises adding a base to the liquid resource. In some embodiments, said precipitating comprises adding a base and an oxidant to the liquid resource. In some embodiments, said precipitating comprises adding NaOH and/or $Ca(OH)_2$ to the liquid resource. In some embodiments, said precipitating comprises adding air or hydrogen peroxide to the liquid resource. In some embodiments, said redissolving comprises combining an acid with the transition metal precipitate. In some embodiments, said combining an acid with said transition metal precipitate occurs 1) prior to combining said transition metal precipitate with said raffinate, or 2) after combining said transition metal precipitate with said raffinate. In some embodiments, the acid comprises hydrochloric acid and/or sulfuric acid. In some embodiments, said redissolving comprises adding hydrochloric acid or sulfuric acid to dissolve said transition metal precipitate. In some embodiments, said precipitating comprises adding a base to the liquid resource, and said redissolving comprises combining an acid with the transition metal precipitate, wherein said acid and said base are produced with an electrochemical cell. In some embodiments, said acid and/or said base are produced with an electrochemical cell. In some embodiments, the electrochemical cell comprises electrodes and membranes. In some embodiments, said acid and/or said base are produced from a salt solution. In some embodiments, said acid and/or said base are produced by splitting said salt solution. In some embodiments, said salt solution comprises a sodium chloride solution. In some embodiments, said acid and/or said base are produced by processing said sodium chloride solution into a hydrochloric acid solution and/or a sodium hydroxide solution, wherein the hydrochloric acid solution comprises said acid and the sodium hydroxide solution comprises said base. In some embodiments, said process further comprises extracting sodium chloride from the liquid resource to form the sodium chloride solution. In some embodiments, said precipitating comprises adding chemicals to the liquid resource. In some embodiments, said separating of said transitional metal precipitate comprises filtration, gravity sedimentation, centrifugal sedimentation, magnetic fields, other methods of solid-liquid separation, or combinations thereof. In some embodiments, said separating of said transitional metal comprises using a filter, a settling tank, a clarifier, a hydrocyclone, a centrifuge, or combinations thereof. In some embodiments, said separating of said transitional metal comprises using a centrifuge. In some embodiments, said process further comprises injecting the raffinate mixture underground. In some embodiments, the liquid resource is obtained from a reservoir. In some embodiments, the liquid resource is pumped out of the reservoir. In some embodiments, said process further comprises injecting the raffinate mixture into said reservoir. In some embodiments, the reservoir is located underground. In some embodiments, said process further comprises agglomerating the transition metal precipitate. In some embodiments, said agglomerating comprises adding a flocculant to the liquid resource. In some embodiments, said separating the transition metal precipitate comprises using a filter, wherein said filter is a belt filter, plate-and-frame filter press, pressure vessel containing filter elements, rotary drum filter, rotary disc filter, cartridge filter, a centrifugal filter with a fixed or moving bed, a metal screen, a perforate basket centrifuge, a three-point centrifuge, a peeler type centrifuge, a pusher centrifuge, or combinations thereof. In some embodiments, said separating the transition metal precipitate further comprises using gravity, centrifugal force, an electric field, vibration, brushes, liquid jets, scrapers, intermittent reverse flow, vibration, crow-flow filtration, and/or pumping suspensions across the surface of the filter. In some embodiments, said separating the transition metal precipitate further comprises moving the transition metal precipitate and the feed liquid tangentially to the filter. In some embodiments, said separating the transition metal precipitate further comprises gravitational, magnetic, centrifugal sedimentation, and/or other means of solid-liquid separation before, during, and/or after filtering. In some embodiments, said process further comprises a plurality of separating processes operated in parallel and/or series. In some embodiments, said precipitating of a transition metal forms a slurry comprising the transition metal precipitate and feed liquid. In some embodiments, the liquid resource is a natural brine, a dissolved salt flat, seawater, concentrated seawater, a geothermal brine, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the desirable metal is Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals. In some embodiments, a plurality of undesirable metals are precipitated and separated from the liquid resource, and redissolved into the raffinate. In some embodiments, a plurality of desirable metals are separated from the feed liquid. In some embodiments, the desirable metal is different from the undesirable metal.

In one aspect, disclosed herein is a process for recovering a desirable metal from a liquid resource, the process comprising: a) precipitating an undesirable metal from the liquid resource to form an undesirable metal precipitate; b) separating said undesirable metal precipitate from the liquid resource to form a feed liquid; c) recovering said desirable metal from the feed liquid to form a raffinate; and d) redissolving said undesirable metal precipitate into said raffinate, a liquid resource, water, waste water, another liquid, or combinations thereof to form a raffinate mixture. In some embodiments, said recovering comprises contacting said feed liquid with ion exchange particles that absorb said desirable metals while releasing protons. In some embodiments, said desirable metal comprises lithium. In some embodiments, said undesirable metal comprises a transition metal. In some embodiments, said desirable metals comprise lithium and said recovering is done by contacting said feed liquid with ion exchange particles that absorb said desirable metals while releasing protons. In some embodiments, said undesirable metals comprise transition metals and said recovering is done by contacting said feed liquid with ion exchange particles that absorb said desirable metals while releasing protons. In some embodiments, said desirable metals comprise lithium, said undesirable metals comprise transition metals, and said recovering is done by contacting said feed liquid with ion exchange particles that absorb said desirable metals while releasing protons. In some embodiments, said precipitating comprises adding a base to the liquid resource. In some embodiments, said precipitating comprises adding a base and/or an oxidant to the liquid resource. In some embodiments, said precipitating comprises adding NaOH and/or $Ca(OH)_2$ to the liquid resource. In some embodiments, said precipitating comprises adding air and/or hydrogen peroxide to the liquid resource. In some embodiments, said redissolving comprises combining an acid with said undesirable metal precipitate. In some embodiments, said combining an acid with said undesirable metal precipitate occurs 1) prior to combining said undesirable metal precipitate with said raffinate, liquid resource, water, waste water, another liquid, or combinations thereof, or 2) after combining said undesirable metal precipitate with said raffinate, liquid resource, water, waste water, another liquid, or combinations thereof. In some embodiments, the acid comprises hydrochloric acid and/or sulfuric acid. In some embodiments, said redissolving comprises adding hydrochloric acid or sulfuric acid to dissolve said undesirable metal precipitate. In some embodiments, said precipitating comprises adding a base to the liquid resource, and said redissolving comprises combining an acid with the undesirable metal precipitate, wherein said acid and said base are produced with an electrochemical cell. In some embodiments, said acid and/or said base are produced with an electrochemical cell. In some embodiments, the electrochemical cell comprises electrodes and membranes. In some embodiments, said acid and/or said base are produced from a salt solution. In some embodiments, said acid and/or said base are produced by splitting said salt solution. In some embodiments, said salt solution comprises a sodium chloride solution. In some embodiments, said acid and/or said base are produced by processing said sodium chloride solution into a hydrochloric acid solution and/or a sodium hydroxide solution, wherein the hydrochloric acid solution comprises said acid and the sodium hydroxide solution comprises said base. In some embodiments, said process further comprises extracting sodium chloride from the liquid resource to form the sodium chloride solution. In some embodiments, said precipitating comprises adding chemicals to the liquid resource. In some embodiments, said separating of the undesirable metal precipitate comprises filtration, gravity sedimentation, centrifugal sedimentation, magnetic fields, other methods of solid-liquid separation, or any combination thereof. In some embodiments, said separating of the undesirable metal precipitate comprises using a filter, a settling tank, a clarifier, a hydrocyclone, a centrifuge, or combinations thereof. In some embodiments, said separating of the undesirable metal precipitate comprises using a centrifuge. In some embodiments, said process further comprises injecting the raffinate mixture underground. In some embodiments, the liquid resource is obtained from a reservoir. In some embodiments, the liquid resource is pumped out of the reservoir. In some embodiments, said process further comprises injecting the raffinate mixture into said reservoir. In some embodiments, the reservoir is located underground. In some embodiments, said process further comprises agglomerating the undesirable metal precipitate. In some embodiments, said agglomerating comprises adding a flocculant to the liquid resource. In some embodiments, said separating the undesirable metal precipitate comprises using a filter, wherein said filter is a belt filter, plate-and-frame filter press, pressure vessel containing filter elements, rotary drum filter, rotary disc filter, cartridge filter, a centrifugal filter with a fixed or moving bed, a metal screen, a perforate basket centrifuge, a three-point centrifuge, a peeler type centrifuge, a pusher centrifuge, or combinations thereof. In some embodiments, said separating the undesirable metal precipitate further comprises using gravity, centrifugal force, an electric field, vibration, brushes, liquid jets, scrapers, intermittent reverse flow, vibration, crow-flow filtration, and/or pumping suspensions across the surface of the filter. In some embodiments, said separating the undesirable metal precipitate further comprises moving the undesirable metal precipitate and the feed liquid tangentially to the filter. In some embodiments, said separating the undesirable metal precipitate further comprises gravitational, magnetic, centrifugal sedimentation, and/or other means of solid-liquid separation before, during, and/or after filtering. In some embodiments, said process further comprises a plurality of separating processes operated in parallel and/or series. In some embodiments, said precipitating of an undesirable metal forms a slurry comprising the undesirable metal precipitate and feed liquid. In some embodiments, the liquid resource is a natural brine, a dissolved salt flat, seawater, concentrated seawater, a geothermal brine, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the desirable metal is Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals. In some embodiments, the undesirable metal is Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals. In some embodiments, a plurality of undesirable metals are precipitated and separated from the liquid resource, and redissolved into the raffinate, liquid resource, water, waste water, another liquid, or combinations thereof. In some embodiments, a plurality of desirable metals are separated from the feed liquid. In some embodiments, the desirable metal is different from the undesirable metal.

In an embodiment, for an aspect disclosed herein, undesirable metals are removed from a liquid resource through precipitation, removal from the liquid resource, redissolution, and mixing with another liquid for disposal. In one embodiment, undesirable metals are removed from a liquid resource through precipitation by addition of base, oxidant, or combinations thereof, removal from the resulting solids from the liquid resource, redissolution of the resulting solids by addition of acid, mixing of the redissolved undesirable metals with another liquid, and disposal of the other liquid. In one embodiment, undesirable metals are removed from a liquid resource through precipitation by addition of base, oxidant, or combinations thereof, removal from the resulting solids from the liquid resource, redissolution of the resulting solids by addition of acid, mixing of the redissolved undesirable metals with waste water, and disposal of the waste water. In one embodiment, redissolved undesirable metals may be mixed with raffinate, waste water, liquid resource, water, or other liquids. In one embodiment, redissolved undesirable metals may be mixed with raffinate, waste water, liquid resource, water, or other liquids for disposal. In one embodiment, solids of undesirable metals may be dissolved in raffinate, waste water, liquid resource, water, or other liquids for disposal. In one embodiment, undesirable metals may be mixed with raffinate, waste water, liquid resource, water, or other liquids for disposal.

In another aspect, disclosed herein is a process for recovering lithium from a liquid resource: a) precipitating a transition metal from said liquid resource to form a transition metal precipitate; b) separating said transition metal precipitate from the liquid resource to form a feed liquid; c) recovering said lithium from said feed liquid to form a raffinate, wherein said recovering of lithium comprises contacting said feed liquid with ion exchange particles that absorb said lithium while releasing protons; and d) redissolving said transition metal precipitate into said raffinate a liquid resource, water, waste water, another liquid, or combinations thereof to form a raffinate mixture.

In another aspect, disclosed herein is a process for recovering a desirable metal from a liquid resource, the process comprising: a) eluting an undesirable metal from the liquid resource through ion exchange; b) separating the undesirable metal from the eluate; and c) injecting the undesirable metal into a reservoir. In some embodiments, said separating the undesirable metal comprises using nano-filtration membranes, precipitation, or combinations thereof. In some embodiments, said process further comprises producing a retentate comprising the dissolved undesirable metal using nano-filtration membranes. In some embodiments, said process further comprises separating the dissolved undesirable metal from the retentate. In some embodiments, the liquid resources is a natural brine, a dissolved salt flat, seawater, concentrated seawater, a geothermal brine, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the undesirable metal is Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, and/or other metals.

In another aspect, disclosed herein is a process for recovering desirable metals from a liquid resource that also contains undesirable metals, said process comprising: a) precipitating the undesirable metals from the liquid resource to form one or more precipitates; b) separating said precipitates from the liquid resource; c) recovering said desirable metals from the liquid resource; and d) redissolving said undesirable metals into said liquid resource. In some embodiments, said recovering is done by contacting said liquid resource with ion exchange particles that absorb said desirable metals while releasing protons. In some embodiments, said desirable metals comprise lithium. In some embodiments, said undesirable metals comprise transition metals. In some embodiments, said desirable metals comprise lithium and said recovering is done by contacting said liquid resource with ion exchange particles that absorb said desirable metals while releasing protons. In some embodiments, said undesirable metals comprise transition metals and said recovering is done by contacting said liquid resource with ion exchange particles that absorb said desirable metals while releasing protons. In some embodiments, said desirable metals comprise lithium, said undesirable metals comprise transition metals, and said recovering is done by contacting said liquid resource with ion exchange particles that absorb said desirable metals while releasing protons. In some embodiments, said precipitating is done by adding base to the liquid resource. In some embodiments, said precipitating is done by adding base and oxidant to the liquid resource. In some embodiments, said precipitating is done by adding NaOH or $Ca(OH)_2$ to the liquid resource. In some embodiments, said precipitating is done by adding air or hydrogen peroxide to the liquid resource. In some embodiments, said redissolving is done by adding acid to dissolve said precipitates. In some embodiments, said redissolving is done by adding hydrochloric acid or sulfuric acid to dissolve said precipitates. In some embodiments, said precipitating is done with a base and said redissolving is done with an acid, wherein said acid and said base are produced with an electrochemical cell. In some embodiments, said electrochemical cell comprises electrodes and membranes. In some embodiments, said separating of precipitates is done using filtration, gravity sedimentation, centrifugal sedimentation, magnetic fields, other methods of solid-liquid separation, or combinations thereof. In some embodiments, said separating is done using a filter, a settling tank, a clarifier, a hydrocyclone, a centrifuge, or combinations thereof. In some embodiments, said separating is done using a centrifuge. In some embodiments, said undesirable metals are redissolved and disposed of by being injected underground.

In another aspect, disclosed herein is a process for separating undesirable metals from a liquid resource to facilitate recovery of desirable metals, said process comprising: a) adding base to said liquid resource to precipitate said undesirable metals as precipitates; b) separating said precipitates from the liquid resource; c) recovering said desirable metals from the liquid resource; and d) adding acid to said precipitates to redissolve for disposal.

In another aspect, disclosed herein is a process for recovering lithium from a liquid resource that also contains transition metals, said process comprising: a) precipitating said transition metals from said liquid resource to form one or more precipitates; b) separating said precipitates from the liquid resource; c) recovering said lithium from said liquid resource by contacting said liquid resource with ion exchange particles that absorb lithium while releasing protons; and d) redissolving said transition metals into said liquid resource. In some embodiments, said precipitating is done by adding base to the liquid resource. In some embodiments, said precipitating is done by adding base and oxidant to the liquid resource. In some embodiments, said precipitating is done by adding NaOH or $Ca(OH)_2$ to the liquid resource. In some embodiments, said precipitating is done by adding air or hydrogen peroxide to the liquid resource. In some embodiments, said redissolving is done by adding acid to dissolve said precipitates. In some embodiments, said redissolving is done by adding hydrochloric acid or sulfuric acid to dissolve said precipitates. In some embodiments, said precipitating is done with a base and redissolving is done with an acid, wherein said acid and said base are produced with an electrochemical cell. In some embodiments, the electrochemical cell comprises electrodes and membranes. In some embodiments, said separating of precipitates is done using filtration, gravity sedimentation, centrifugal sedimentation, magnetic fields, other methods of solid-liquid separation, or combinations thereof. In some embodiments, said separating is done using a filter, a settling tank, a clarifier, a hydrocyclone, a centrifuge, or combinations thereof. In some embodiments, said separating is done using a centrifuge. In some embodiments, said undesirable metals are redissolved and disposed of by being injected underground.

In another aspect, disclosed herein is a process for separating transition metals from a liquid resource to facilitate recovery of lithium, comprising: a) adding base to said liquid resource to precipitate said transition metals as precipitates; b) separating said precipitates from the liquid resource; c) recovering said lithium from the liquid resource; and d) adding acid to said precipitates to redissolve for disposal.

In another aspect, disclosed herein is a process for separating undesirable metals from a liquid resource to facilitate recovery of desirable metals, said process comprising: a) adding base to said liquid resource to precipitate said undesirable metals as precipitates; b) separating said precipitates from the liquid resource using gravity sedimentation; c) recovering said desirable metals from the liquid resource; and d) adding acid to said precipitates to redissolve for disposal.

In another aspect, disclosed herein is a process for separating undesirable metals from a liquid resource to facilitate recovery of desirable metals, said process comprising: a) adding base to said liquid resource to precipitate said undesirable metals as precipitates; b) separating said precipitates from the liquid resource using centrifugal sedimentation; c) recovering said desirable metals from the liquid resource; and d) adding acid to said precipitates to redissolve for disposal.

In another aspect, disclosed herein is a process for separating undesirable metals from a liquid resource to facilitate recovery of desirable metals, said process comprising: a) adding base to said liquid resource to precipitate said undesirable metals as precipitates; b) separating said precipitates from the liquid resource using filtration; c) recovering said desirable metals from the liquid resource; and d) adding acid to said precipitates to redissolve for disposal.

In another aspect, disclosed herein is a process for separating undesirable metals from a liquid resource to facilitate recovery of desirable metals, said process comprising: a) splitting a salt solution into acid and base using an electrochemical cell; b) adding said base solution to said liquid resource to precipitate said undesirable metals as precipitates; c) separating said precipitates from the liquid resource using filtration; d) recovering said desirable metals from the liquid resource; and e) adding said acid solution to said precipitates to redissolve for disposal.

In another aspect, disclosed herein is a process for separating undesirable metals from a liquid resource to facilitate recovery of desirable metals, said process comprising: a) splitting a salt solution into acid and base using an electrochemical cell; b) adding said base solution to said liquid resource to precipitate said undesirable metals as precipitates; c) separating said precipitates from the liquid resource using filtration; d) recovering said desirable metals from the liquid resource; and e) adding said acid solution to said precipitates to redissolve for disposal.

In another aspect, disclosed herein is a process for separating undesirable metals from a liquid resource to facilitate recovery of desirable metals, said process comprising: a) processing a sodium chloride solution into a hydrochloric acid solution and a sodium hydroxide solution using one or more electrochemical cells; b) adding said sodium hydroxide solution to said liquid resource to precipitate said undesirable metals as precipitates; c) separating said precipitates from the liquid resource using filtration; d) recovering said desirable metals from the liquid resource; and e) adding said hydrochloric acid solution to said precipitates to redissolve said precipitates for disposal.

In another aspect, disclosed herein is a process for separating undesirable metals from a liquid resource to facilitate recovery of desirable metals, said process comprising: a) processing a sodium chloride solution into a hydrochloric acid solution and a sodium hydroxide solution using one or more electrochemical cells; b) adding said sodium hydroxide solution to said liquid resource to precipitate said undesirable metals as precipitates; c) separating said precipitates from the liquid resource using filtration; d) recovering said desirable metals from the liquid resource; e) adding said hydrochloric acid solution to said precipitates to redissolve said precipitates; and f) mixing the redissolved precipitates with the liquid resource.

In another aspect, disclosed herein is a process for separating undesirable metals from a liquid resource to facilitate recovery of desirable metals, said process comprising: a) processing a sodium chloride solution into a hydrochloric acid solution and a sodium hydroxide solution using one or more electrochemical cells; b) adding said sodium hydroxide solution to said liquid resource to precipitate said undesirable metals as precipitates; c) separating said precipitates from the liquid resource using filtration; d) recovering said desirable metals from the liquid resource; e) mixing said precipitates with the liquid resource to form a mixture; and f) adding said hydrochloric acid to said mixture to redissolve the precipitates.

In another aspect, disclosed herein is a process for separating undesirable metals from a liquid resource to facilitate recovery of desirable metals, said process comprising: a) pumping said liquid resource out of a reservoir; b) processing a sodium chloride solution into a hydrochloric acid solution and a sodium hydroxide solution using one or more electrochemical cells; c) adding said sodium hydroxide solution to said liquid resource to precipitate said undesirable metals as precipitates; d) separating said precipitates from the liquid resource using filtration; e) recovering said desirable metals from the liquid resource; f) adding said hydrochloric acid solution to said precipitates to redissolve said precipitates; g) mixing the redissolved precipitates with the liquid resource; and h) reinjecting the liquid resource into a reservoir.

In another aspect, disclosed herein is a process for separating undesirable metals from a liquid resource to facilitate recovery of desirable metals, said process comprising: a) pumping said liquid resource out of a reservoir; b) processing a sodium chloride solution into a hydrochloric acid solution and a sodium hydroxide solution using one or more electrochemical cells; c) adding said sodium hydroxide solution to said liquid resource to precipitate said undesirable metals as precipitates; d) separating said precipitates from the liquid resource using filtration; e) recovering said desirable metals from the liquid resource; f) mixing said precipitates with the liquid resource to form a mixture; g) adding said hydrochloric acid to said mixture to redissolve the precipitates; and h) reinjecting said liquid resource into a reservoir.

In another aspect, disclosed herein is a process for separating undesirable metals from a liquid resource to facilitate recovery of desirable metals, said process comprising: a) pumping said liquid resource out of a reservoir; b) processing a sodium chloride solution into a hydrochloric acid solution and a sodium hydroxide solution using one or more electrochemical cells; c) adding said sodium hydroxide solution to said liquid resource to precipitate said undesirable metals as precipitates; d) separating said precipitates from the liquid resource using centrifugation; e) recovering said desirable metals from the liquid resource; f) mixing said precipitates with the liquid resource to form a mixture; g) adding said hydrochloric acid to said mixture to redissolve the precipitates; and h) reinjecting said liquid resource into a reservoir.

In another aspect, disclosed herein is a process for separating transition metals from a liquid resource to facilitate recovery of lithium, comprising: a) pumping said liquid resource out of a reservoir; b) processing a sodium chloride solution into a hydrochloric acid solution and a sodium hydroxide solution using one or more electrochemical cells; c) adding said sodium hydroxide solution to said liquid resource to precipitate said transition metals as precipitates; d) separating said precipitates from said liquid resource using centrifugation; e) recovering said lithium from said liquid resource by contacting said liquid resource with ion exchange particles that absorb said lithium while releasing protons; f) redissolving said precipitates into said liquid resource by adding said hydrochloric acid solution; and g) reinjecting said liquid resource into a reservoir.

In another aspect, disclosed herein is a process for separating undesirable metals from a liquid resource to facilitate recovery of desirable metals, said process comprising: a) extracting sodium chloride from said liquid resource to form a sodium chloride solution; b) processing said sodium chloride solution into a hydrochloric acid solution and a sodium hydroxide solution using one or more electrochemical cells; c) adding said sodium hydroxide solution to said liquid resource to precipitate said undesirable metals as precipitates; d) separating said precipitates from the liquid resource using filtration; e) recovering said desirable metals from the liquid resource; f) adding said hydrochloric acid solution to said precipitates to redissolve said precipitates; and g) mixing the redissolved precipitates with the liquid resource.

In another aspect, disclosed herein is a process for separating undesirable metals from a liquid resource to facilitate recovery of desirable metals, said process comprising: a) extracting sodium chloride from said liquid resource to form a sodium chloride solution; b) processing said sodium chloride solution into a hydrochloric acid solution and a sodium hydroxide solution using one or more electrochemical cells; c) adding said sodium hydroxide solution to said liquid resource to precipitate said undesirable metals as precipitates; d) separating said precipitates from the liquid resource using filtration; e) recovering said desirable metals from the liquid resource; f) mixing said precipitates with the liquid resource to form a mixture; and g) adding said hydrochloric acid to said mixture to redissolve the precipitates.

In another aspect, disclosed herein is a process for separating undesirable metals from a liquid resource to facilitate recovery of desirable metals, said process comprising: a) adding chemicals to said liquid resource to precipitate said undesirable metals as precipitates; b) separating said precipitates from the liquid resource; c) recovering said desirable metals from the liquid resource; and d) adding acid to said precipitates to redissolve for disposal.

In some embodiments, in any process disclosed herein, said desirable metals include lithium. In some embodiments, in any process disclosed herein, said undesirable metals include iron and manganese.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein is optionally employed in practicing the invention. It is intended that the following claims define the scope of the invention and that methods and structures within the scope of these claims and their equivalents be covered thereby.

What is claimed is:

1. A process for recovering one or more desirable metals from a liquid resource, the process comprising:
    a) precipitating one or more undesirable metals from the liquid resource to form one or more undesirable metals precipitate;
    b) separating said one or more undesirable metals precipitate from the liquid resource to form a feed liquid;
    c) recovering said one or more desirable metals from the feed liquid to form a raffinate; and
    d) redissolving said one or more undesirable metals precipitate into said raffinate to form a raffinate mixture;
    wherein the one or more desirable metal is different from the one or more undesirable metals.

2. The process of claim 1, wherein said recovering comprises contacting said feed liquid with ion exchange particles that absorb said one or more desirable metals while releasing protons.

3. The process of claim 1, wherein said desirable one or more metals comprises lithium.

4. The process of claim 1, wherein said one or more undesirable metals comprises a transition metal.

5. The process of claim 1, wherein said precipitating comprises adding a base, an oxidant, or both, to the liquid resource.

6. The process claim 1, wherein said precipitating comprises adding NaOH, $Ca(OH)_2$, or both, to the liquid resource.

7. The process of claim 1, wherein said redissolving comprises combining an acid with said one or more undesirable metal precipitates.

8. The process of claim 7, wherein the acid comprises hydrochloric acid, sulfuric acid, or both.

9. The process of claim 1, wherein said precipitating comprises adding a base to the liquid resource, wherein said redissolving comprises combining an acid with said one or more undesirable metal precipitates, wherein said acid, said base, or both are produced with an electrochemical cell.

10. The process of claim 1, wherein said separating of the one or more undesirable metal precipitates comprises filtration, gravity sedimentation, centrifugal sedimentation, or any combination thereof.

11. The process of claim 10, wherein said separating of the one or more undesirable metal precipitates comprises using a filter, a settling tank, a clarifier, a hydrocyclone, a centrifuge, or combinations thereof.

12. The process of claim 11, wherein said separating of the one or more undesirable metal precipitates comprises using a centrifuge.

13. The process of claim 1, further comprising injecting the raffinate mixture underground.

14. The process of claim 1, further comprising injecting the raffinate mixture into 1) a first reservoir from where the liquid resource is obtained, 2) a second reservoir different from where the liquid resource is obtained, or 3) both.

15. A process for separating one or more undesirable metals from a liquid resource, the process comprising:
   a) adding a base to said liquid resource to precipitate said one or more undesirable metals, thereby forming one or more undesirable metal precipitates;
   b) separating said undesirable metal precipitate from said liquid resource to form a feed liquid;
   c) recovering one or more desirable metals from the feed liquid;
   d) combining an acid to said one or more undesirable metal precipitates to form a solution of one or more redissolved undesirable metals; and
   e) injecting the solution of one or more redissolved undesirable metals underground or into a reservoir;
   wherein the one or more desirable metal is different from the one or more undesirable metals.

16. The process of claim 15, wherein said recovering comprises contacting said feed liquid with ion exchange particles that absorbs said one or more desirable metals while releasing protons.

17. The process of claim 15, wherein said one or more desirable metals comprises lithium.

18. The process of claim 15, wherein said one or more undesirable metals comprises a transition metal.

19. The process of claim 15, further comprising adding an oxidant with said base to said liquid resource.

20. The process of claim 15, wherein said base comprises NaOH, $Ca(OH)_2$, or both.

21. The process of claim 15, wherein the acid comprises hydrochloric acid, sulfuric acid, or both.

22. The process of claim 15, wherein said acid, said base, or both, are produced with an electrochemical cell.

23. The process of claim 15, wherein said separating of the one or more undesirable metal precipitates comprises filtration, gravity sedimentation, centrifugal sedimentation, or any combination thereof.

24. The process of claim 23, wherein said separating of the one or more undesirable metal precipitates comprises using a filter, a settling tank, a clarifier, a hydrocyclone, a centrifuge, or a combination thereof.

25. The process of claim 15, wherein said disposal comprises injecting the solution of one or more redissolved undesirable metals into 1) a first reservoir from where the liquid resource is obtained, 2) a second reservoir different from where the liquid resource is obtained, or 3) both.

26. The process of claim 3, wherein the one or more undesirable metals comprises one or both of manganese and iron.

27. The process of claim 15, wherein the one or more undesirable metals comprises one or both of manganese and iron.

\* \* \* \* \*